(12) United States Patent
Hughes

(10) Patent No.: US 6,429,860 B1
(45) Date of Patent: Aug. 6, 2002

(54) METHOD AND SYSTEM FOR RUN-TIME VISUALIZATION OF THE FUNCTION AND OPERATION OF A COMPUTER PROGRAM

(75) Inventor: Ronald P. Hughes, Felton, CA (US)

(73) Assignee: Visicomp, Inc., Felton, CA (US)

( * ) Notice: Subject to any disclaimer, the term of this patent is extended or adjusted under 35 U.S.C. 154(b) by 63 days.

(21) Appl. No.: 09/594,208

(22) Filed: Jun. 14, 2000

Related U.S. Application Data

(60) Provisional application No. 60/139,337, filed on Jun. 15, 1999.

(51) Int. Cl.$^7$ ................................................ G06T 1/00
(52) U.S. Cl. ........................... 345/418; 345/804; 703/22
(58) Field of Search ................................ 709/108, 107; 717/4, 8; 345/339, 346, 355, 356, 357, 764, 771, 804, 848, 853; 703/22

(56) References Cited

U.S. PATENT DOCUMENTS

| | | |
|---|---|---|
| 5,410,648 A | 4/1995 | Pazel |
| 5,848,274 A | 12/1998 | Hamby et al. |
| 5,920,725 A | 7/1999 | Ma et al. |

OTHER PUBLICATIONS

Poltrock, S.E. et al. "Graphics Interfaces for Knowledge–based Systems Development". Conference on Human Factors and Computing Systems. Apr., 1986, p. 12, right Col., lines 8–16.

Mukherjea, S. et al. "Toward visual debugging integrating algrotihm animation capabilities within a source level debugger". ACM Transactions on Computer–Human Interaction. vol. 1. No. 3 1994, Table I, Figure 4.

Matsukoa, S. et al. "A General Framework for Bidirectinal translation between Abstract and Pictorial Data". ACM Transactions on Computer–Human Interation, vol. 1 Issue 3, 1994.

PCT Search Report—PCTU/S 00/16789, Oct. 3, 2000.

*Primary Examiner*—Mark Zimmerman
*Assistant Examiner*—Philip H. Stevenson
(74) *Attorney, Agent, or Firm*—Blakely, Sokoloff, Taylor & Zafman

(57) ABSTRACT

A software visualization tool enables a user to observe the inner workings of a computer program (e.g., a Java program) while it executes. An original program is augmented with calls to a shadow machine at locations where the original program modifies a data structure maintained by the data program or updates values in a value set maintained within the context of the data structure.

A duplicate copy of the data structure and the value set for the augmented program is maintained during execution of the computer program by a shadow machine. A display engine accesses the duplicate copy of the data structure and the value set, and displays a visual representation of the duplicate copy on a display device so as to facilitate visualization of the execution of the augmented program in a dynamic and near real-time manner.

70 Claims, 23 Drawing Sheets

METHOD AND SYSTEM FOR RUN-TIME VISUALIZATION OF THE FUNCTION AND OPERATION OF A COMPUTER PROGRAM

This application claims priority from U.S. provisional application serial No. 60/139,337, entitled "METHOD AND APPARATUS FOR IMPLEMENTING A SOFTWARE VISUALIZATION TOOL", and filed Jun. 15, 1999.

FIELD OF THE INVENTION

The present invention relates generally to the field of software visualization and, more specifically, to a method and system for visualizing the run-time functioning and operations of a computer program via a visual display presented by a user interface.

BACKGROUND OF THE INVENTION

While a number of software visualization tools exist, some programming environments (e.g., the Java programming environment) impose restrictions on access to data structures maintained by program (e.g., variables). Within the Java programming environment, for example, local variables (i.e., variables contained in a method invocation frame) can only be accessed by code in that method and by an extant thread, when the relevant method currently being executed at the top of the extant thread's stack. Further, class and object variables may be declared in such a way so as to prevent access by code to such class and object variables outside the relevant class. It will be appreciated that the access restrictions to the structure of the computer program are problematic for a third party visualization tool, which seeks to provide a visual view of such data structures.

By way of background to the Java program environment, Java is an object-oriented language. Java source code files (files with a java extension) are compiled into a format called "bytecode" (files with a .class extension), which can be executed by a Java interpreter. Compiled Java code can be run across multiple platforms by Java interpreters and run-time environments, known as Java Virtual Machines JVMs), that have been developed for a variety of platforms (e.g., Unix, the Macintosh Operating System, and the Windows family of operating systems). Bytecode may be converted directly into machine language instructions by a Just-in-Time compiler (JIT).

FIG. 1 is a diagrammatic representation of the execution of a Java program. Java class files (i.e., bytecode), which comprises the compiled Java code, are converted to machine-language program code 14 by the JIT of the Java Virtual Machine. The program code 14 in turn dynamically creates and maintains a program data structure, and also populates the data structure 16 with a value set 18 (e.g., numeric, text or alphanumeric values).

SUMMARY OF THE INVENTION

According to a first aspect of the present invention, there is provided a method of visualizing functioning of a computer program. A duplicate copy of a data structure of the computer program is maintained during an execution (or run-time) of the computer program. A visual representation of the duplicate copy of the data structure is displayed on a display device so as to visualize the execution of the computer program.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for visualizing the functioning of a computer program are described. In the following description, for purposes of explanation, numerous specific details are set forth in order to provide a thorough understanding of the present invention. It will be evident, however, to one skilled in the art that the present invention may be practiced without these specific details.

Overview

During the course of the execution of a computer program, for example written in an object-oriented language, the computer program may create new objects, destroy existing objects, change references between objects, and modify the values of variables contained within objects. The present invention proposes a method and system that presents a visualization of operations and functioning of a computer program that modifies the state of data. The invention, in one embodiment, proposes presenting and updating a corresponding visual representation in a display window so that a user may observe the state of the computer program as it evolves and is modified any time during execution of the computer program.

The present invention is described within the context of the Java programming environment, and utilizing the Java programming language, as developed by Sun Microsystems. Nonetheless, it will be appreciated that the teachings of the present invention are not limited to a Java environment, and may be utilized to provide access to the data structure and value set of any computer program wherein the relevant program environment poses restrictions on access to such data structures and/or such value sets. A visualization program that comprises one embodiment of the present invention, is described below as being implemented in Java in order to make it platform-independent. Again, it will be appreciated that the visualization program may be written in any programming language, and is not limited to the Java programming language.

Figure 1:
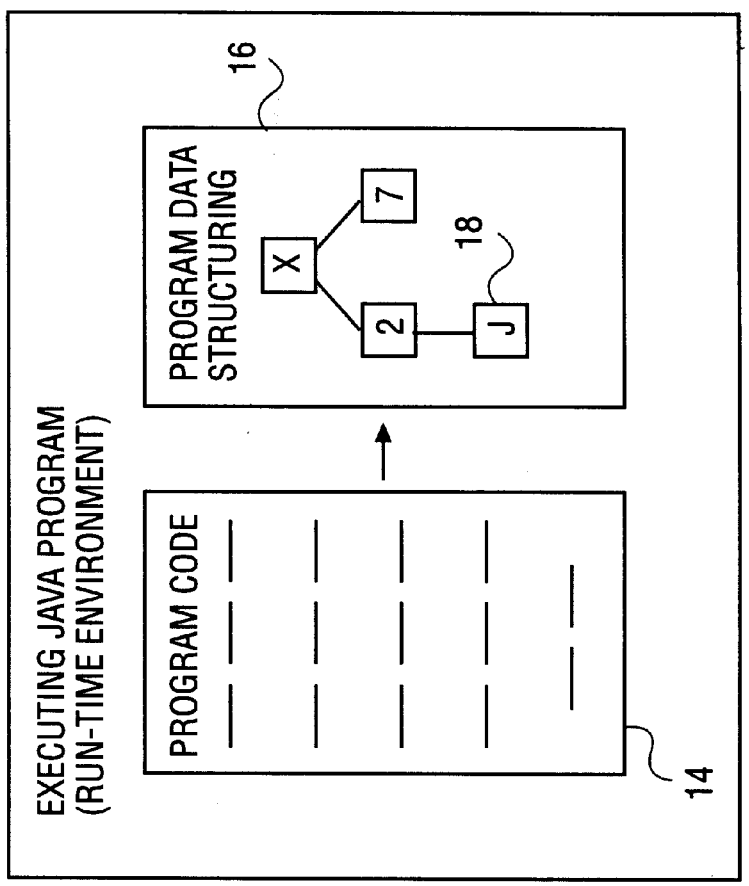
FIG. 1 is a diagrammatic representation of a prior art execution of a Java program.
Figure 1:
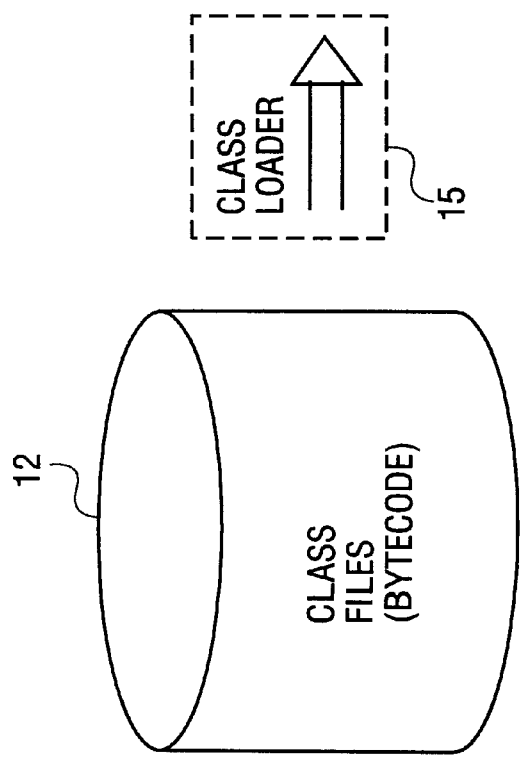
Figure 2A:
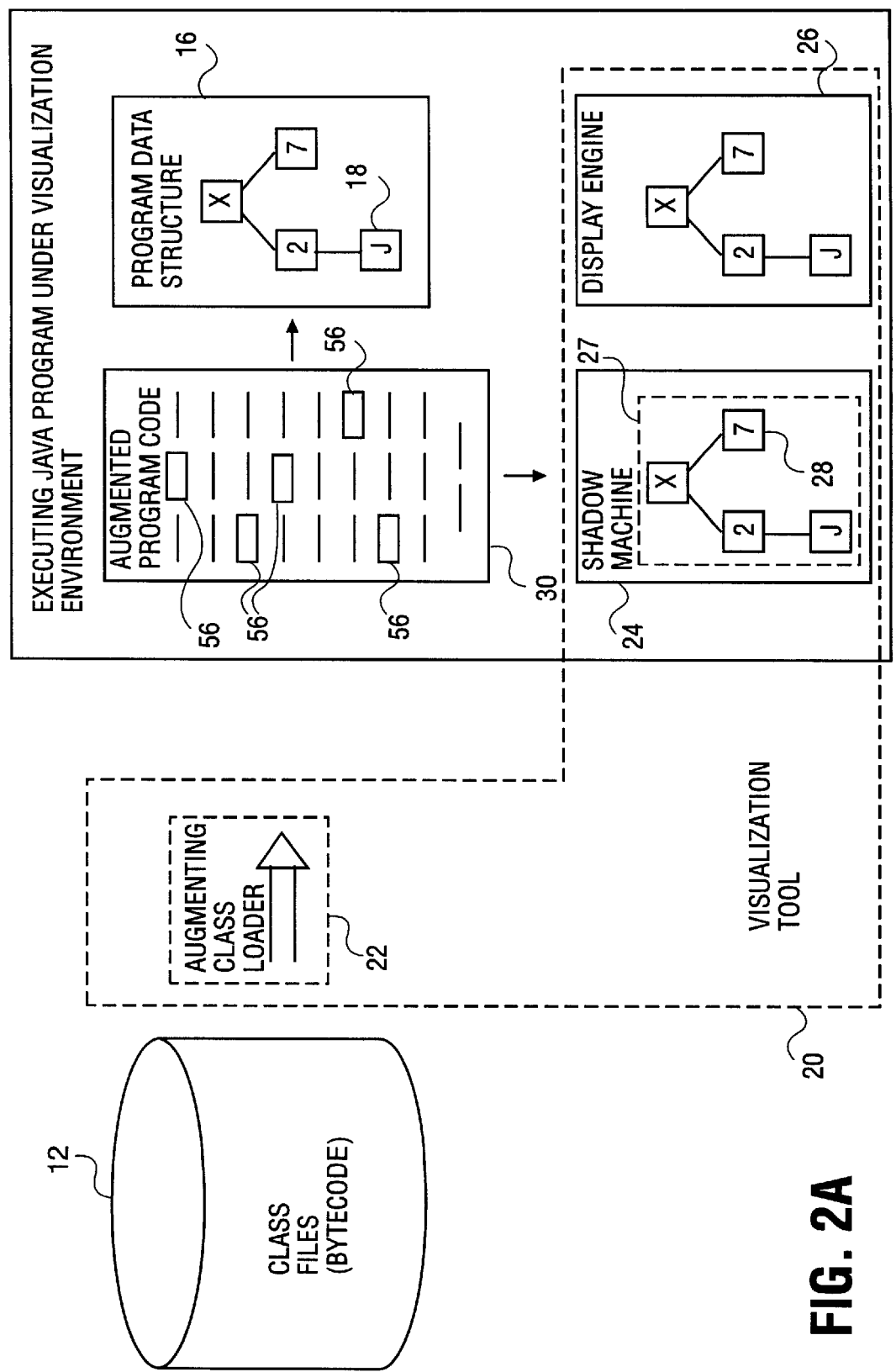
FIGS. 2A and 2B are diagrammatic representations of respective exemplary embodiments of a visualization tool.
Figure 2B:
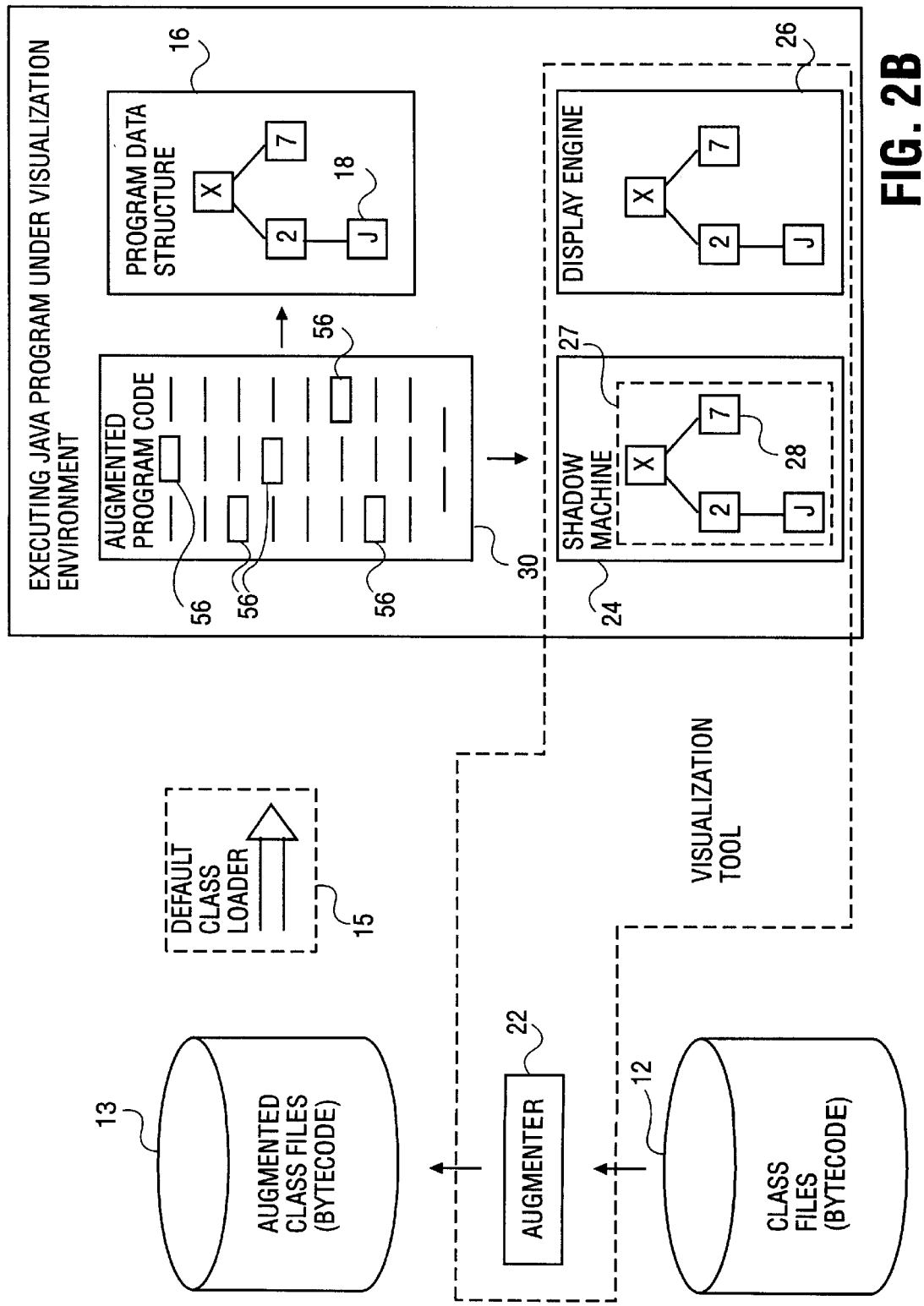

FIG. 2A is a diagrammatic representation of an exemplary embodiment of a visualization tool 20 that embodies a method and system for visualizing the functioning and operations of the computer program. The visualization tool 20 is shown to include three major sub-systems, namely an augmenter 22, in the exemplary form of an augmenting class loader, a shadow machine 24 that maintains a duplicate copy 27 of the data structure and value set 28 of an augmented program code 30, and a display engine 26 which provides a visual representation of the duplicate copy of the data structure and value set maintained by the shadow machine 24. Further details regarding each of the subsystems of the visualization tool 20 will be discussed in further detail below. FIG. 2B is a diagrammatic representation of an alternative embodiment of the visualization tool 20.

Figure 3:
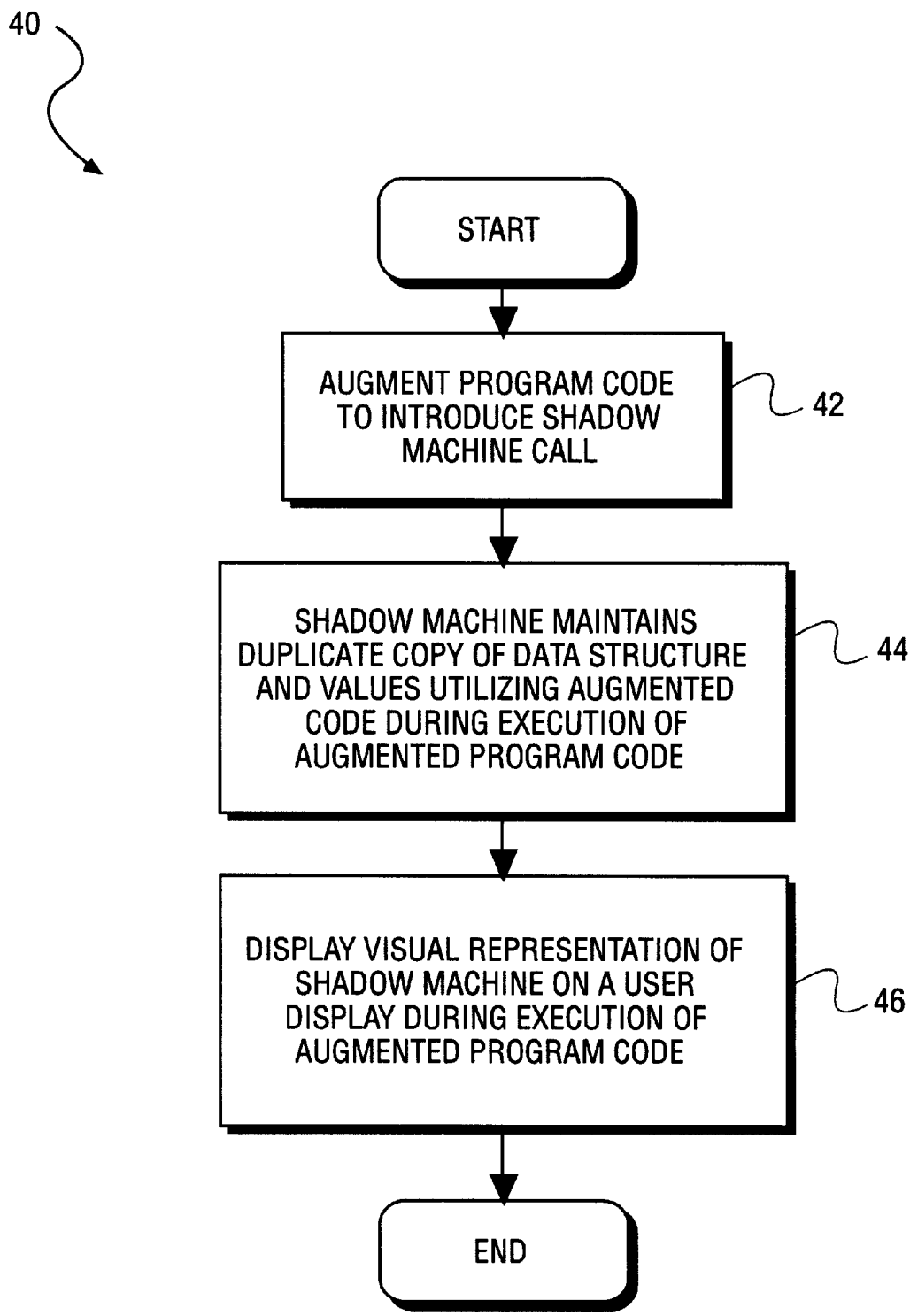
FIG. 3 is a flow chart providing an overview of a method, according to an exemplary embodiment, of visualizing the function and operation of a computer program.

FIG. 3 is a flow chart providing an overview of a method 40, according to an exemplary embodiment, of visualizing the functioning and operation of the computer program. The various operations of the method 40 are performed by the respective sub-systems of the visualization tool 20. Specifically, at block 42, the augmenter 22 augments a program code to generate the augmented program code 30 to include calls to the shadow machine 24. Each call to the shadow machine 24 includes a data structure identifier and/or an update value that the shadow machine 24 utilizes to maintain the duplicate copy 27 of the data structure and/or the value set.

At block 44, the shadow machine 24 maintains the duplicate copy 27 of the data structure and value set utilizing the augmented program code 30, during execution of such augmented program code 30.

At block 46, the display engine 26 displays a visual representation of the duplicate copy 27 of the data structure and/or value set as maintained by the shadow machine 24 on a user display. The display of the visual representation may, in one embodiment, be presented in a dynamic manner during run-time of the augmented program code 30 so as to provide a dynamic, near real-time view of the internal operations and functions performed by the augmented program code 30.

Augmenter (22)

One embodiment of the present invention requires that original program code (e.g., bytecode) be augmented prior to execution to produce instructions that issue calls to the shadow machine 24 so as to maintain a synchronized state between original program data structure 16 and the value set 18, and a duplicate copy 27 of the original data structure and value set, as maintained by the shadow machine 24.

Figure 4:
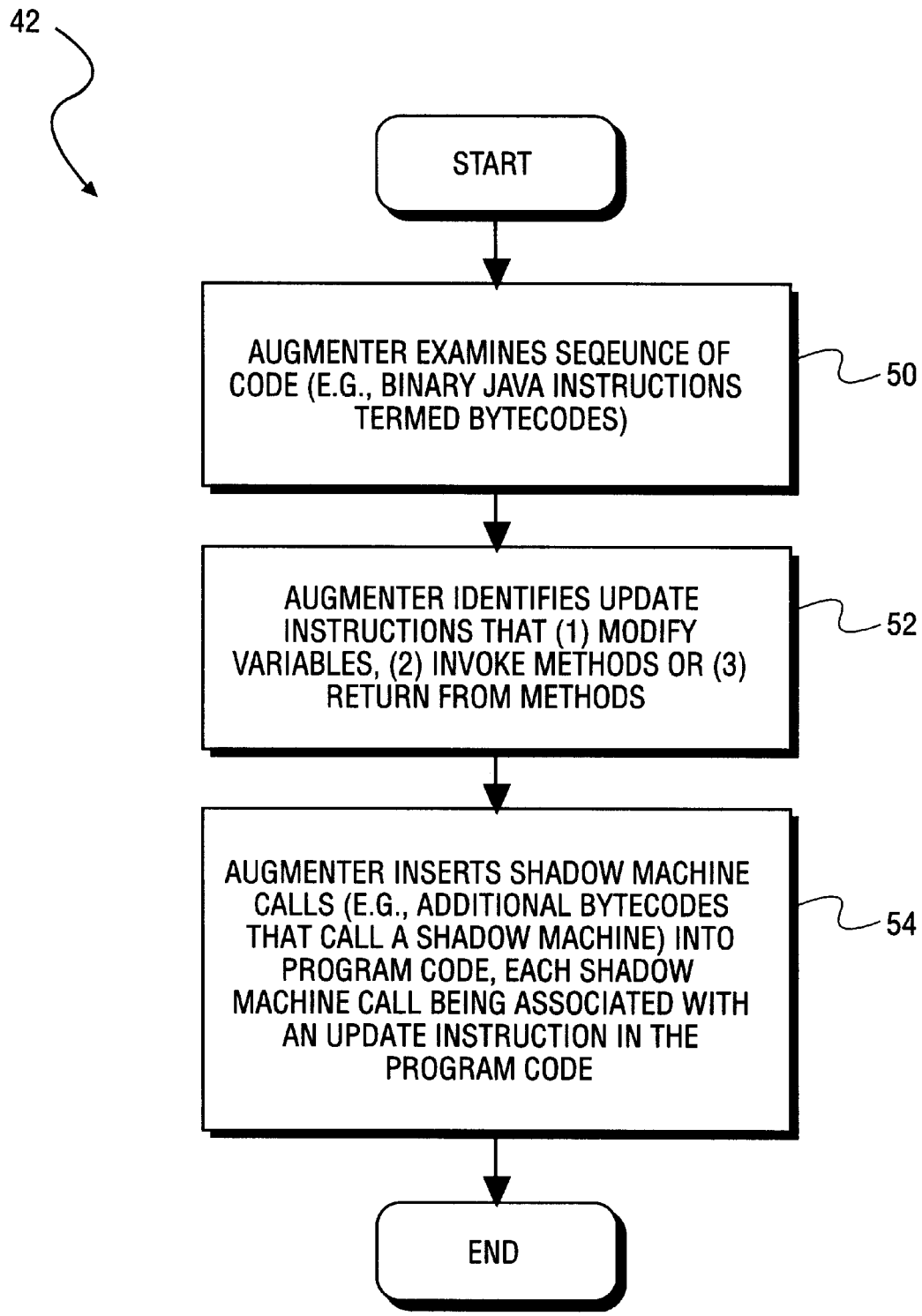
FIG. 4 is a flow chart illustrating a method, according to an exemplary embodiment, of performing an augmenting operation with respect to program code.

FIG. 4 is a flow chart illustrating a method 42, according to an exemplary embodiment, of performing the augmenting operation described above at block 42 with reference to FIG. 3. The method 42 commences at block 50, with the augmenter 22 examining a sequence of code (e.g., the class files (bytecode) 12). In one embodiment of the present invention, the augmenter 22 may be implemented as the augmenting class loader illustrated in FIG. 2 that augments the class files 12 (on the fly) as they are loaded for execution. To this end, the Java programming environment provides a mechanism whereby a customized class loader (i.e., the augmenting class loader) may be defined and used to load classes. The augmenting class loader may locate and read classes in the same manner as a default class loader, and augment class files before communicating them to a Java Virtual Machine for loading and linking.

In the alternative embodiment shown in FIG. 2B, the augmenter 22 is an independent program that reads the class files 12 and produces augmented class files 13 that may be loaded by a default class loader 15.

At block 52, the augmenter identifies update instructions within the class files 12 that potentially modify or update the data structure or value set maintained by the augmented program code 30. For example, the augmenter 22 may identify update instructions that (1) modify variables, (2) invoke methods, or (3) return from methods.

At block 54, having identified such update instructions, the augmenter 22 then proceeds to insert shadow machine call instructions 56 (e.g., additional instructions in the form of bytecode that call the shadow machine 24) into the original bytecode. These additional bytecodes (i.e., instructions) are associated with update instructions, and pass information that specifies details of the operation performed by the relevant update instructions. For example, where an update instruction modifies a value for a variable, the inserted augmenting instructions (i.e., shadow machine call) may communicate details concerning the relevant object, a field, and an update value to the shadow machine 24. The shadow machine 24 may then utilize such information to update a corresponding shadow field in a shadow object so as to maintain a synchronous state between the original program data structure and value set and the duplicate copy 27 thereof. Further details regarding the execution of such augmenting instructions are provided below.

Figure 5:
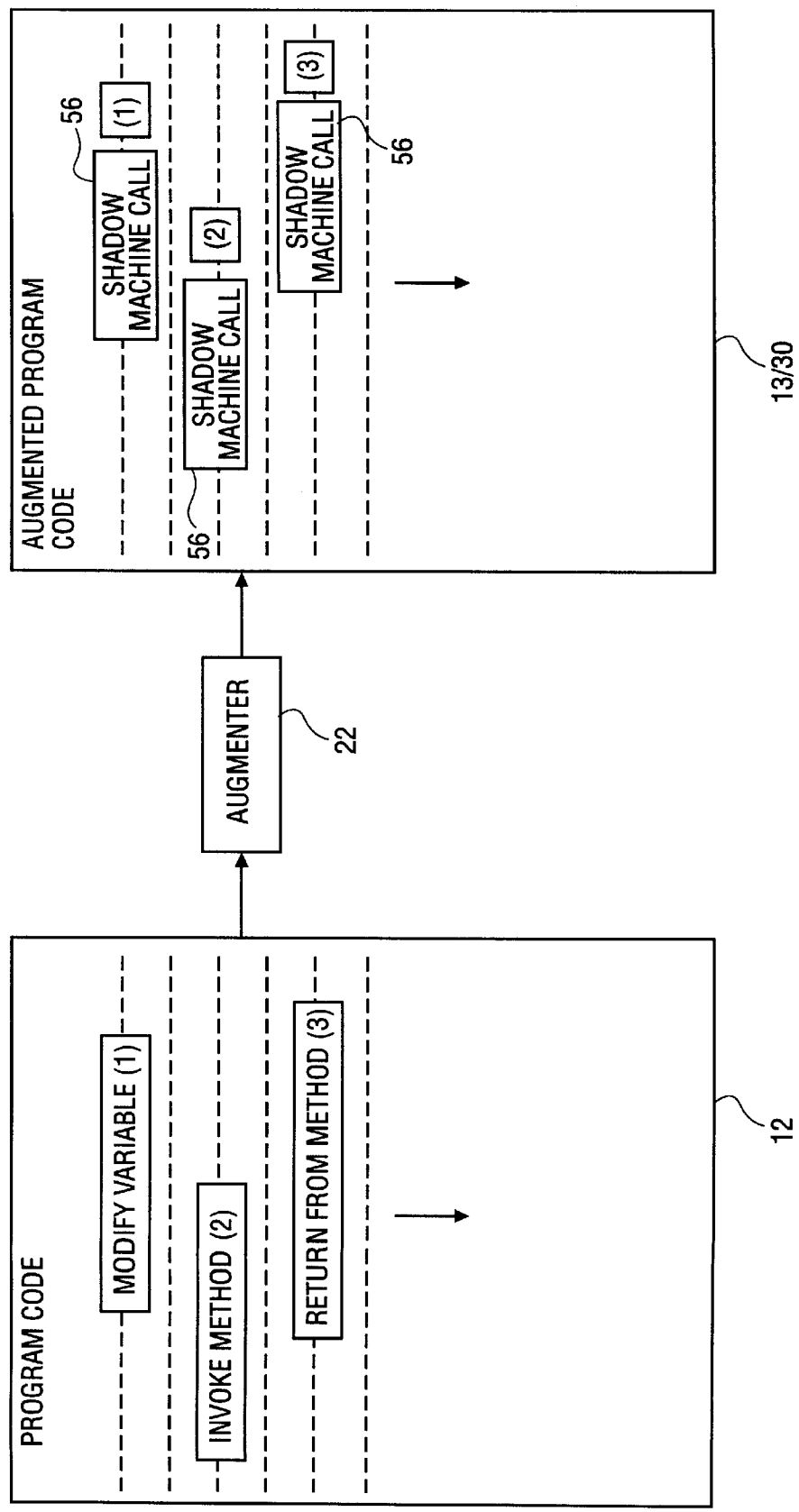
FIG. 5 is a block diagram illustrating the insertion of an exemplary shadow machine call instruction into augmented program code.

FIG. 5 is a block diagram illustrating unmodified program code in the form of class files 12, including instructions that modify a variable, invoke a method and return from a method. FIG. 5 further illustrates how shadow machine call instructions 56 are inserted into augmented program code 13 (uncompiled) or 30 (compiled) so as to communicate appropriate update information to the shadow machine 24.

Shadow Machine (24)

In order to allow the visualization tool 20 to determine the value of any variable, or the data structure, of an executing program, the shadow machine 24 maintains the duplicate copy 27 of such a data structure and/or value set. To enable the shadow machine 24 to perform this function, the augmented program code 30, as described above, communicates update information to the shadow machine 24. The shadow machine 24 includes a copy of the entire data structure of an executing program, as well as a copy of the value set stored in the context of such a data structure.

It may be useful to consider an exemplary data structure maintained by a computer program. Taking a Java program as an example, an executing Java program typically maintains its state explicitly within variables (named containers, each of which holds a value that the Java program can modify) and implicitly in threads (entities that execute Java instructions, one after the other).

Figure 6:
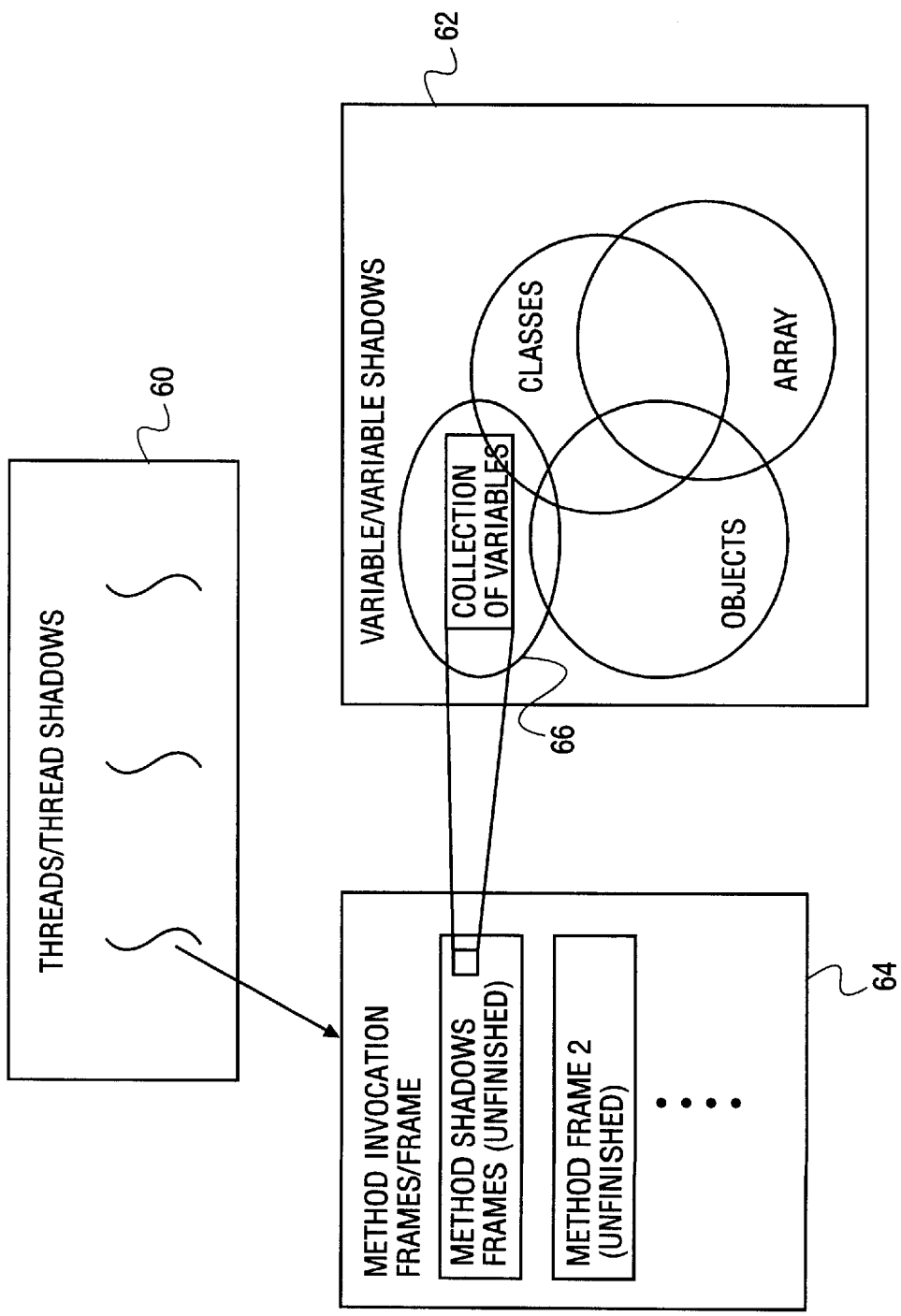
FIG. 6 provides a diagrammatic representation of an exemplary original data structure that may be maintained by a shadow machine, according to an exemplary embodiment of the present invention.

FIG. 6 provides an exemplary representation of at least a portion of an exemplary original data structure 16 that may be mirrored (or shadowed) by the shadow machine 24. Specifically, FIG. 6 shows a collection of threads 60 and a collection of variables 62, each thread and variable having a corresponding shadow maintained by the shadow machine 24.

Each thread of the Java program may maintain a stack of method invocation frames 64, each frame corresponding to an unfinished invocation of a method. Each frame may contain a collection 66 of variables. As illustrated, variables can also be contained in classes (related to variables and methods), objects (instantiations of classes), and arrays (indexed collections of variables of the same type).

Figure 7:
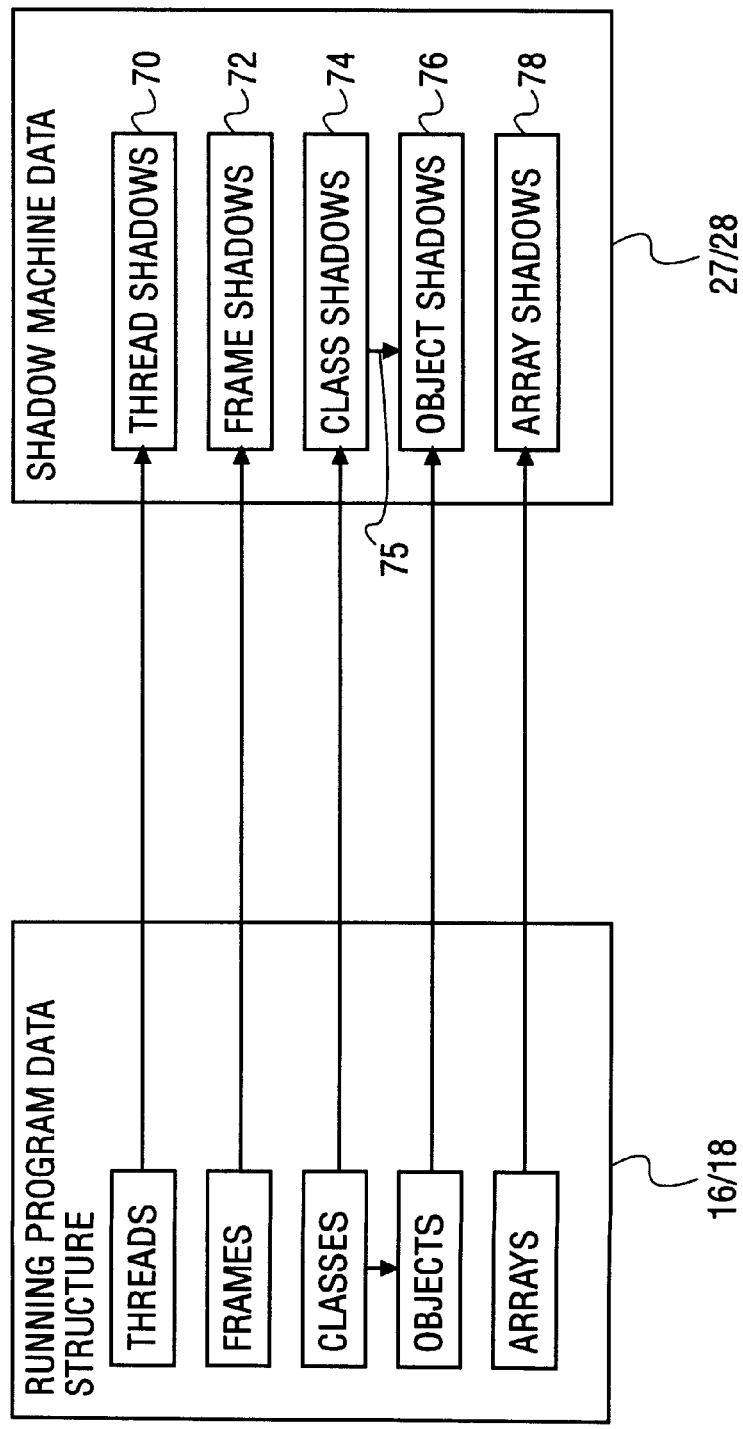
FIG. 7 is a block diagram illustrating an exemplary original data structure and value set, and a duplicate data structure and value set as maintained by the shadow machine.

FIG. 7 is a block diagram illustrating the original data structure and/or value set maintained for the executing program, as well as the duplicate data structure and value set maintained by the shadow machine 24. Specifically, the duplicate data structure is shown to include thread shadows 70, frame shadows 72, class shadows 74, object shadows 76 and array shadows 78. Further details after each of these shadow data structures will provided below with reference to FIG. 8.

Figure 8A:
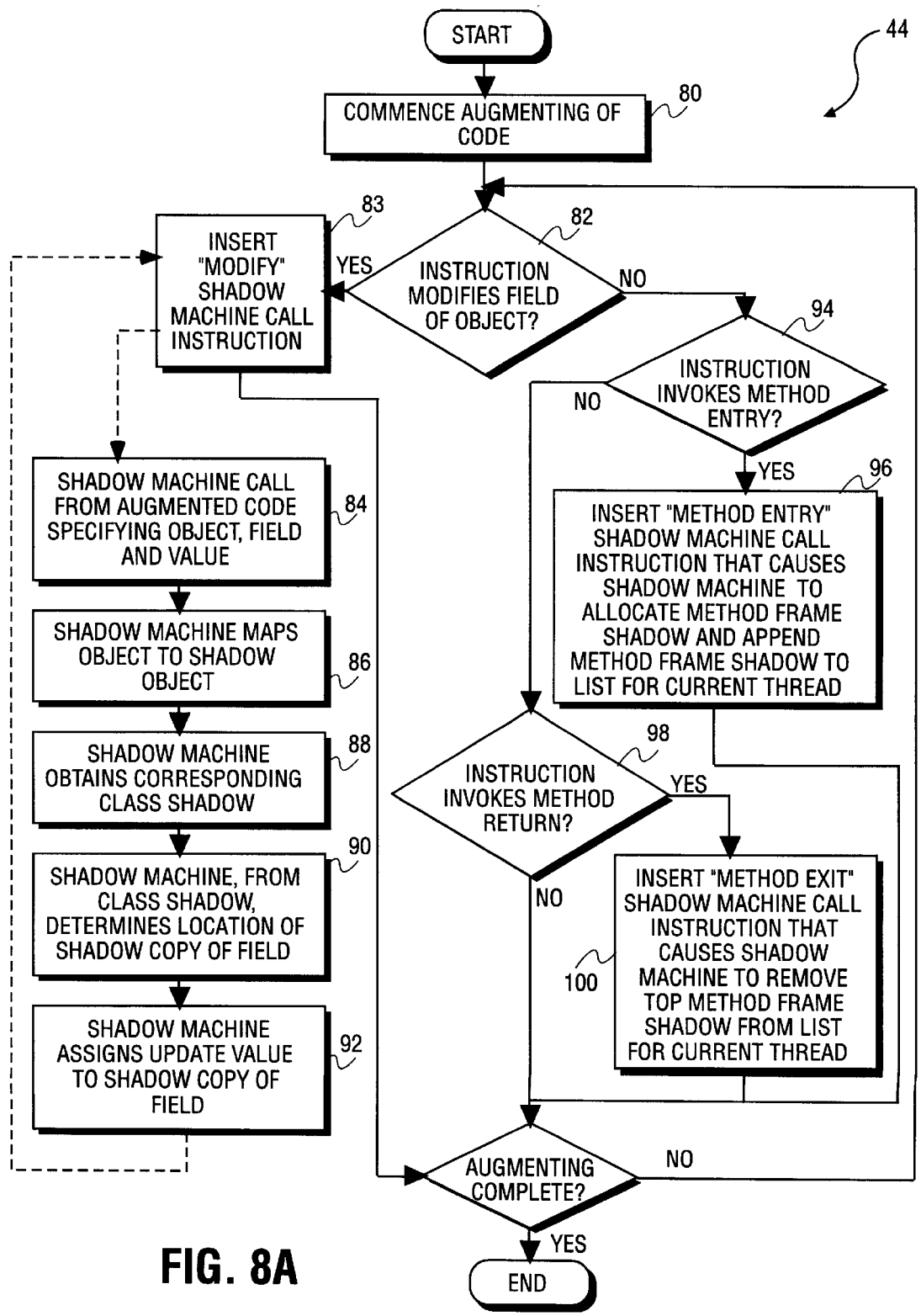
FIG. 8A is a flow chart illustrating further detail regarding a method, according to an exemplary embodiment, of augmenting program code by the insertion of shadow machine call instructions into the program code, and the various operations that may be performed by the inserted shadow machine call instructions.

FIG. 8A is a flow chart illustrating a method 44, according to an exemplary embodiment, of maintaining the duplicate copy 27 of the data structure and/or value set by the generation of the augmented program code 30. The method 44 provides further details regarding exemplary method 44 of performing an augmenting operation, as described with FIG. 3. Specifically, FIG. 8A illustrates operation that may be invoked by an inserted shadow machine call instruction 56.

The method 44 commences at block 80 with the augmenting of the program code 30. At decision block 82, update instructions that modify a field of an object are identified. Following a positive determination at decision block 82, the method 44 proceeds to block 83, where the augmenter 22 inserts a "modify" shadow machine call instruction 56 into the program code, the inserted instruction 56 being associated with the update instruction at decision block 82. The various operations that are preformed responsive to the "modify" shadow machine call instruction 56 are illustrated in blocks 84 through 92. It will be appreciated that these operations are only performed at run-time of the augmented program code 30, and not during actual augmenting of the original program code, as has been described with reference to FIG. 8A. Further details regarding each of the operations performed responsive to an actual execution of the "modify" shadow machine call instruction 56 will now be described.

At block 84, a shadow machine call is issued from the augmented program code 30, required by an appropriate shadow machine call instruction 56. The shadow machine call specifies an object of the original data structure 16 to which the update applies, a field of the specified object to which the updated applies, and an update value. As described above, each object of the original data structure 16 has a corresponding object shadow 76 maintained by the shadow machine 24. Each object shadow 76 in turn maintains copies of all the fields that make up the original object.

At block 86, the shadow machine 24 maps the object identified by the call to a shadow object. To this end, the shadow machine 24 maintains a mapping (not shown) between objects and the corresponding object shadows so as to enable the shadow machine 24 to locate an object shadow corresponding to a specified object.

At block 88, the shadow machine 24, from the identified object shadow 76, identifies a corresponding class shadow 74.

At block 90, the shadow machine 24, from the class shadow 74, determines the location of a shadow copy of the specified field within an array shadow 78.

At block 92, the shadow machine 24 then assigns the data value to the shadow copy of the specified field within the identified array shadow 78.

Figure 9:
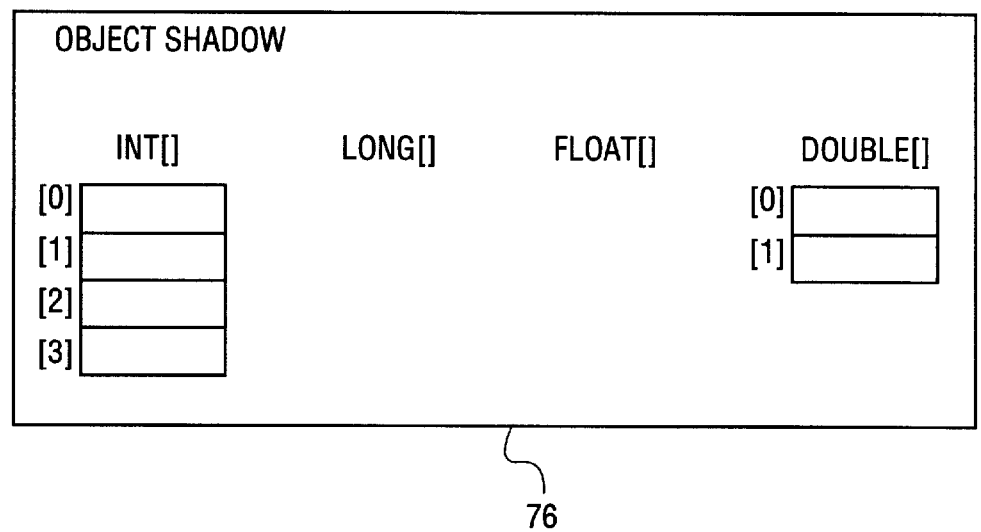
FIG. 9 is a diagrammatic representation of an exemplary object shadow corresponding to an original object that may maintained by the shadow machine.

It should be noted that each object shadow 76 maintains the values of all fields of the corresponding original object. Accordingly, each object shadow 76 is able to accommodate the various quantity and types of fields specified in any one of multiple different classes. To achieve this in a type-safe manner, each object shadow 76 contains an array for each fundamental title (e.g., int, long, float, double, etc.). Each field of the corresponding class is mapped to a particular element in the array of the corresponding class. Values in the array shadows 78 are updated as their associated fields in the original objects of the original data structure 16 are changed. FIG. 9 provides a diagrammatic representation of an exemplary object shadow 76 corresponding to an original object containing four integer and two double variables.

As stated above, object shadows are required to be able to deal with the various bits of data associated with all of the various classes provided within the original data structure 16 that may be loaded and utilized by the augmented program 30. Each particular class defines a fixed set of object variables. Accordingly, within the visualization tool 20, each object shadow 76 has a corresponding class shadow 74, which maintains the sets of fields and mappings for them to the associated type indices. For example, consider the following class definition fragment:

```
Class Foo {
    private int count;
    private double x;
    private double y;
    private int index;
    private Foo next;
}
```

The class shadow 74 corresponding to an original class Foo will maintain the following mappings:

| 0 | "count" | int    | 0 (index in int array)    |
| 1 | "x"     | double | 0 (index in double array) |
| 2 | "y"     | double | 1 (index in double array) |
| 3 | "index" | int    | 1 (index in int array)    |
| 4 | "next"  | object | 0 (index in object array) |

Accordingly, each object shadow 76 maintains a reference 75, to a corresponding class shadow 74, as illustrated in FIG. 7. Thus, for example, when the augmented program code 30 sends a value to a variable in an object of a task, the augmented program code 30 calls the shadow machine 24 specifying the object, the field index and the update value. A value is then assigned to a shadow variable in the manner described above with reference to blocks 84–92.

Returning to method 44 illustrated in FIG. 8, at decision block 941 should an instruction that invokes a method entry be detected, the method 44 proceeds to block 96. At block 96, the augmenter proceeds to insert a "method entry" shadow machine call instruction 56. During actual execution of the augmented program code 30, and responsive to the "method entry" shadow machine call instruction 56, the shadow machine 24 allocates a method frame shadow 72 and appends the allocated method frame shadow 72 to a list of such frame shadows for a current thread being executed by the augmented program code 30.

At decision block 98, a determination is made as to whether an instruction within the augmented program code 30 is detected that invokes a method return. Following a positive determination at decision block 98, the method 44 proceeds to block 100. At block 100, the augmenter 22 proceeds to insert a "method exit" shadow machine call instruction 56. Upon actual execution of the augmented code, and responsive to the "method exit" shadow machine call instruction 56, the shadow machine 24 removes a top method frame shadow from a list for a current thread.

By way of further information regarding the operations performed responsive to the instructions inserted at blocks 96 and 100, the augmented program code 30 calls the shadow machine 24 whenever a method is entered, and whenever a return is made from a previously entered method. This allows the visualization tool 20 to keep track of the backtrace of method calls for each thread of execution by the augmented program code 30. As describe above, each thread shadow 70, which mirrors a thread in the original data structure 16, comprises a list of method frame shadows 72, one corresponding to each active method which has been called but not yet returned. Whenever a method is entered by the augmented program code 30, the shadow machine 24 is called. The shadow machine 24 allocates another method frame shadow 72 to the list corresponding to the current thread. Upon return, a top method frame shadow 72 is removed from the list.

Each method frame shadow 72 corresponds to active implementation of a method by the augmented program code 30, and may contain multiple local variables of various types. As with an object shadow 76, each method frame shadow 72 may contain one array per fundamental type to hold copies of current values of local variables. Whenever the augmented program code 30 sets a value to a local variable, the shadow machine 24 is called and the corresponding array element in the appropriate type array is updated. Each class shadow 74 contains method frame shadows 72 for each method defined therein, and each of these in turn contains the mappings for local variables to type array indices.

In an alternative embodiment of the present invention, an interpreter may be modified such that, at run-time, interpreter may identify update instructions "on the fly" as they are executed by the interpreter, and issue a shadow machine call directly to the shadow machine 24. In this way, the need to generate augmented program code 30 is obviated. However, in order to generate such a modified interpreter, access to interpreter source code is required, this access not always being available to the developer of a visualization tool 20. Further, the modification of an interpreter (which will typically be platform specific to its implementation) requires that the visualization tool 20 be tied to the modified interpreter, and thus not deployable across various platforms. However, an advantage of such an approach is that there is no requirement to pre-process (e.g., augment) the class files 13 as described above.

Figure 8B:
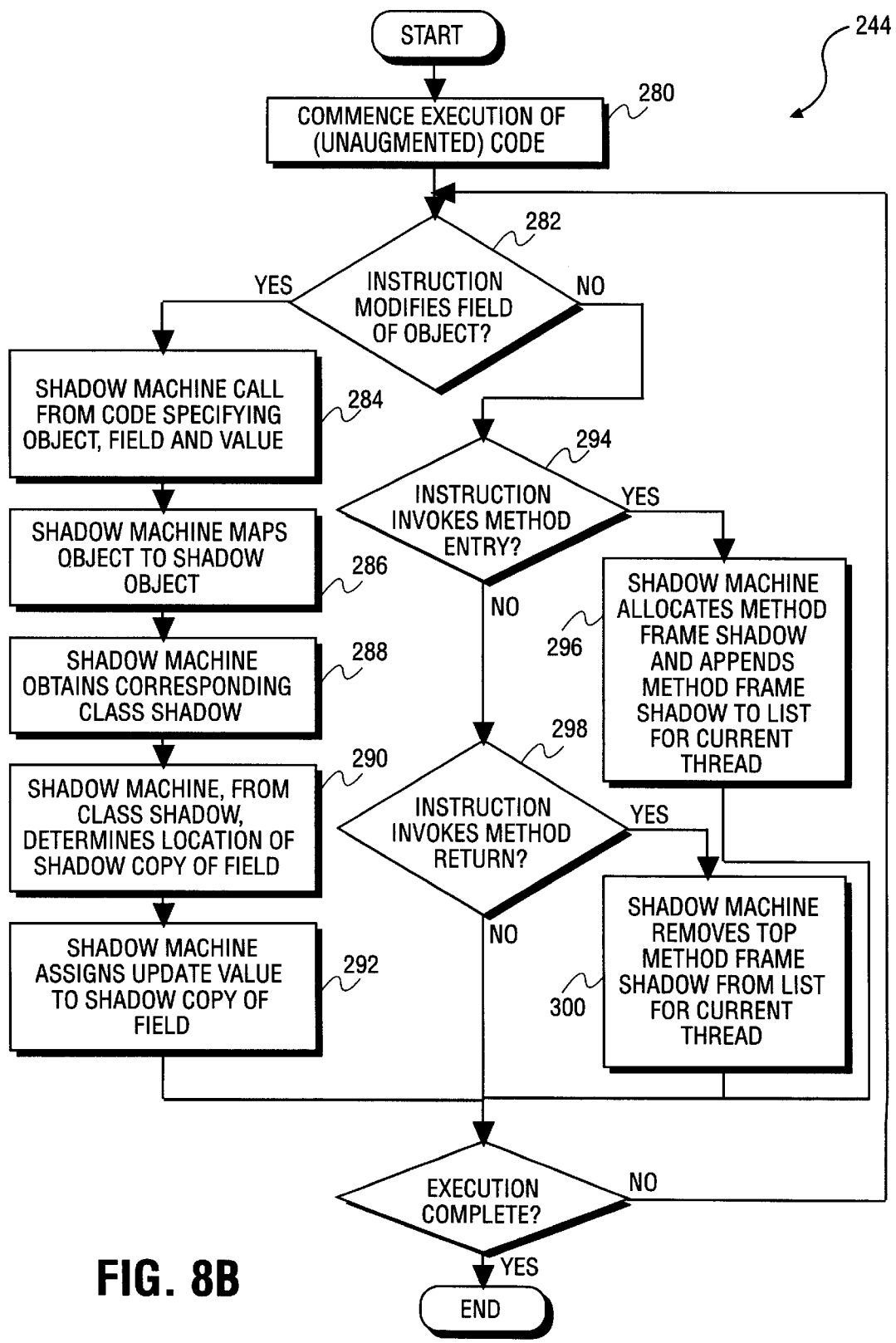
FIG. 8B is a flow chart illustrating a method, according to an alternative exemplary embodiment, of maintaining a duplicate copy of a data structure and/or value set utilizing a modified interpreter that identifies modifying instructions "on the fly".

FIG. 8B is a flow chart illustrating a method 224, according to an exemplary embodiment of the present invention, illustrating operations that may be performed by a modified interpreter, such as that discussed above, that may at run-time identify instructions "on the fly" and issue shadow machine calls responsive to such instructions. Instructions that may be of interest, and invoke such shadow machine calls, are identified at decision blocks 282, 294 and 298. The operations that are performed responsive to such shadow machine calls by a modified interpreter are substantially the same as those discussed with reference to FIG. 8A and do not require further explanation.

Display Engine (26)

Referring back to FIG. 2A, the display engine 26 comprises part of the visualization tool 20 and is called by the shadow machine 24 to update the contents of a display window 110 whenever there is an update to a variable of the duplicate copy of the data structure. The display engine 26 is also responsive to input from the user via an input device, such as a cursor control device (e.g., a mouse) or a keyboard.

The display of all information pertaining to the dynamic state of an executing computer program may prove overwhelming to a user and accordingly be of limited use. The display engine 26, according to one embodiment, includes facilities that allow a user to specify a subset of the duplicate copy 27 of the data structure and/or value set that the user wishes to view. Specifically, the present invention contemplates that a user may, via interface provided by the display engine 26, indicate a particular subset of the duplicate copy 27 of the data structure (e.g., particular classes) that the user is interested in viewing. In addition, for each data item (e.g., class or object) that is displayed, the user may specify which contained variables, and associated values, are to be shown and which are to be hidden. In this way a user is presented with the option of filtering out extraneous data.

The display engine 26 also allows a user to examine displayed data in multiple views, as will be described in further detail below. Specifically, a user may zoom in to view more detail, and zoom out to see an overall view of a data structure. Scrolling and panning of views is also supported. A user may also control the speed at which a program executes, and can pause or single step the execution of the augmented program code 30.

Figure 10:
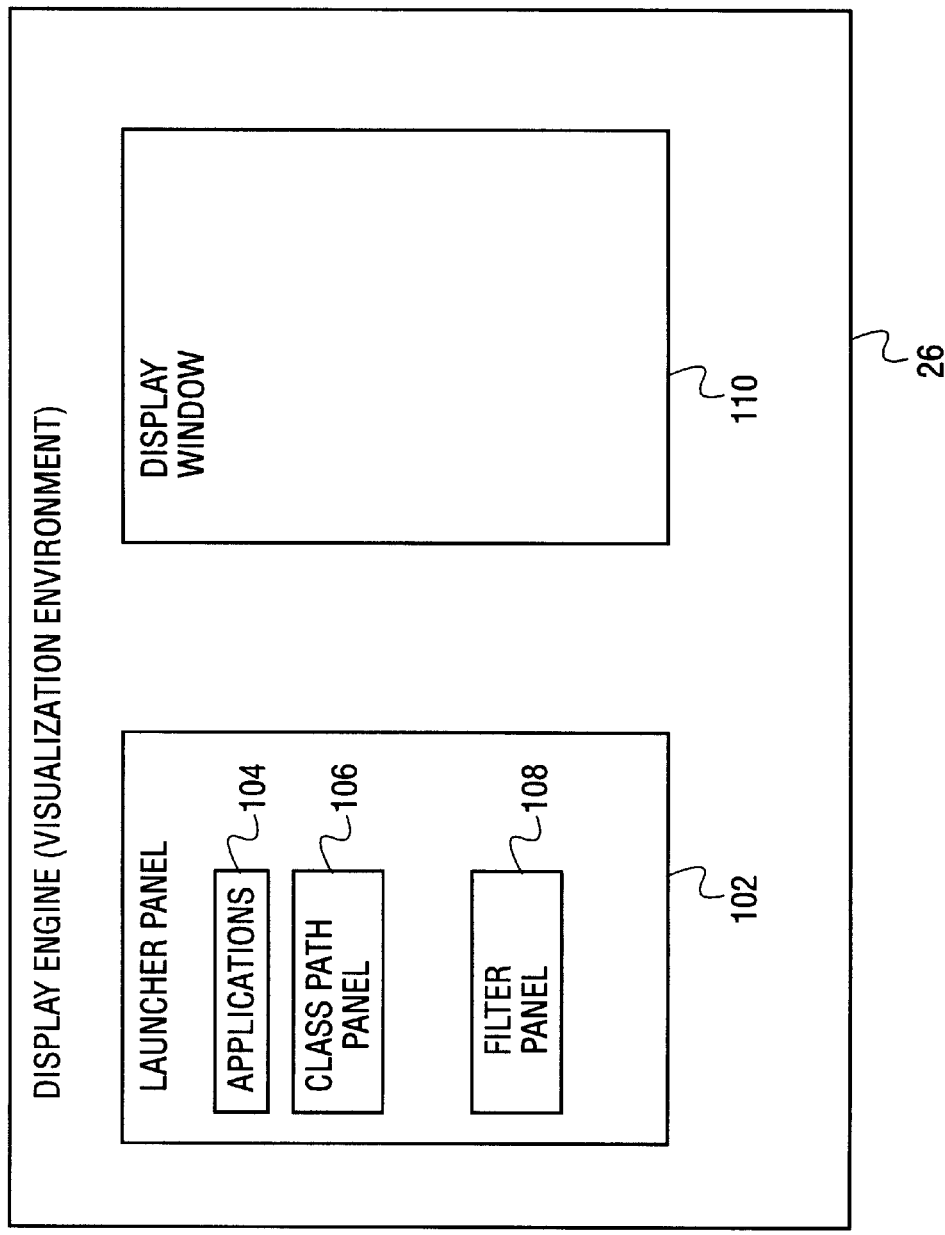
FIG. 10 is a diagrammatic representation of a display engine, according to an exemplary embodiment of the present invention.

FIG. 10 is a diagrammatic representation of a display engine 26, according to an exemplary embodiment. The display engine 26 is shown to include a launcher 102 and a display window 110. The launcher 102 facilitates the execution of the augmented program code 30 under a visualization environment provided by the visualization tool 20. The launcher 102 includes an applications panel 104, a class path panel 106 and a filter panel 108, which will be described in further detail below. At a high level, the applications panel 104 allows a user to identify a program to be executed in conjunction with the visualization tool 20, the class path panel 106 allows a user to include appropriate class files (e.g., jar, zip, etc.) for display, and the filter panel 108 enables a user to select for display any combination of packages or classes.

The display engine 26, in one embodiment, dynamically reveals the inner workings of a computer program (e.g., a Java application or applet) at run-time providing visual representations of data structures that are displayed "on the fly" as a new real-time manifestation. The display engine 26 furthermore displays associations of objects, and provides information regarding references between such instances by employing a node-link representation. At a high level, one embodiment of a display engine 26 may provide a run-time display of class instantiation, the selected display of individual packages, classes and fields, and the dynamic display of data structures including class association, data variable updating and reference variable modification.

Figure 11A:
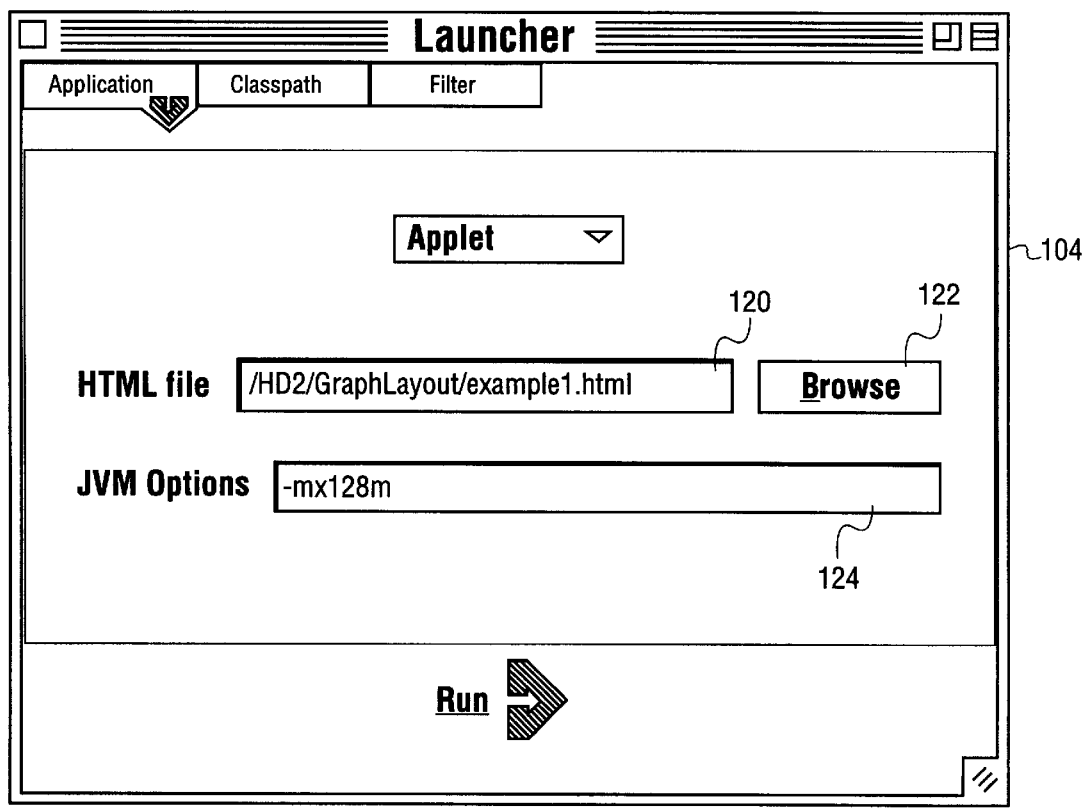
FIGS. 11A–11D illustrate exemplary panels, or interfaces, that may be presented by a launcher component of the display engine.
Figure 11B:
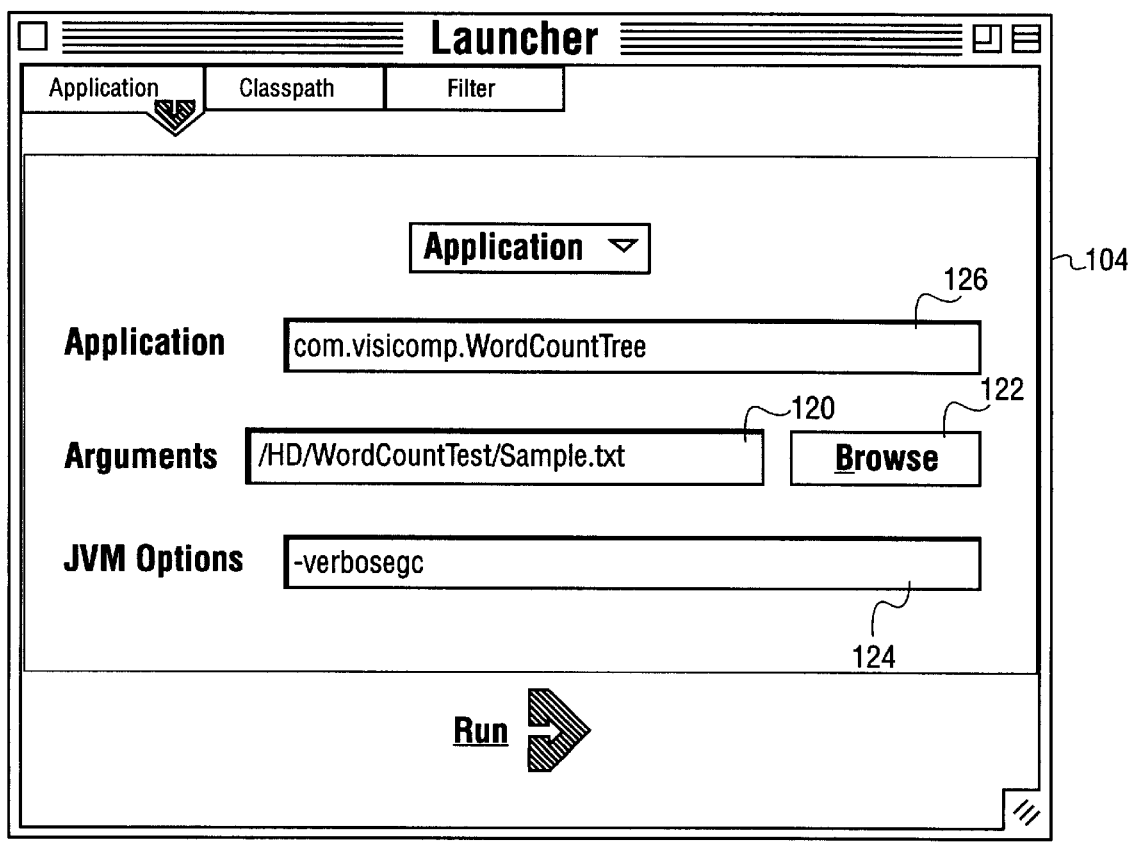

Dealing first with the applications panel 104, FIGS. 11A and 11B illustrate respective exemplary embodiments of the applications panel 104. The embodiment shown in FIG. 11A is utilized when the program code to be executed comprises an applet, whereas the embodiment shown in FIG. 11B is utilized when the executed program code comprises an application. The embodiment of the applications panel 104 shown in FIG. 11A includes an HTML file field 120 that contains the name of the file that specifies the applet to be executed (or run). The contents of this field are inputted manually or by clicking on the "browse button" to invoke a browser by which a user may navigate to a directory containing the file.

A Java Virtual Machine (JVM) options field 124 allows a user to enter a JVM-specific option to assist the execution of the applet under the visualization tool 20 utilizing a local system JVM. For example, a user may enter an option instructing the JVM to allocate more memory to the visualization tool 20.

Turning to the embodiment of the applications panel 104 shown in FIG. 11B, this window includes an application field 126 specifying a fully qualified class name for the application to be executed. An arguments field 128 specifies the location of a supporting data file, and/or other parameters.

Figure 11C:
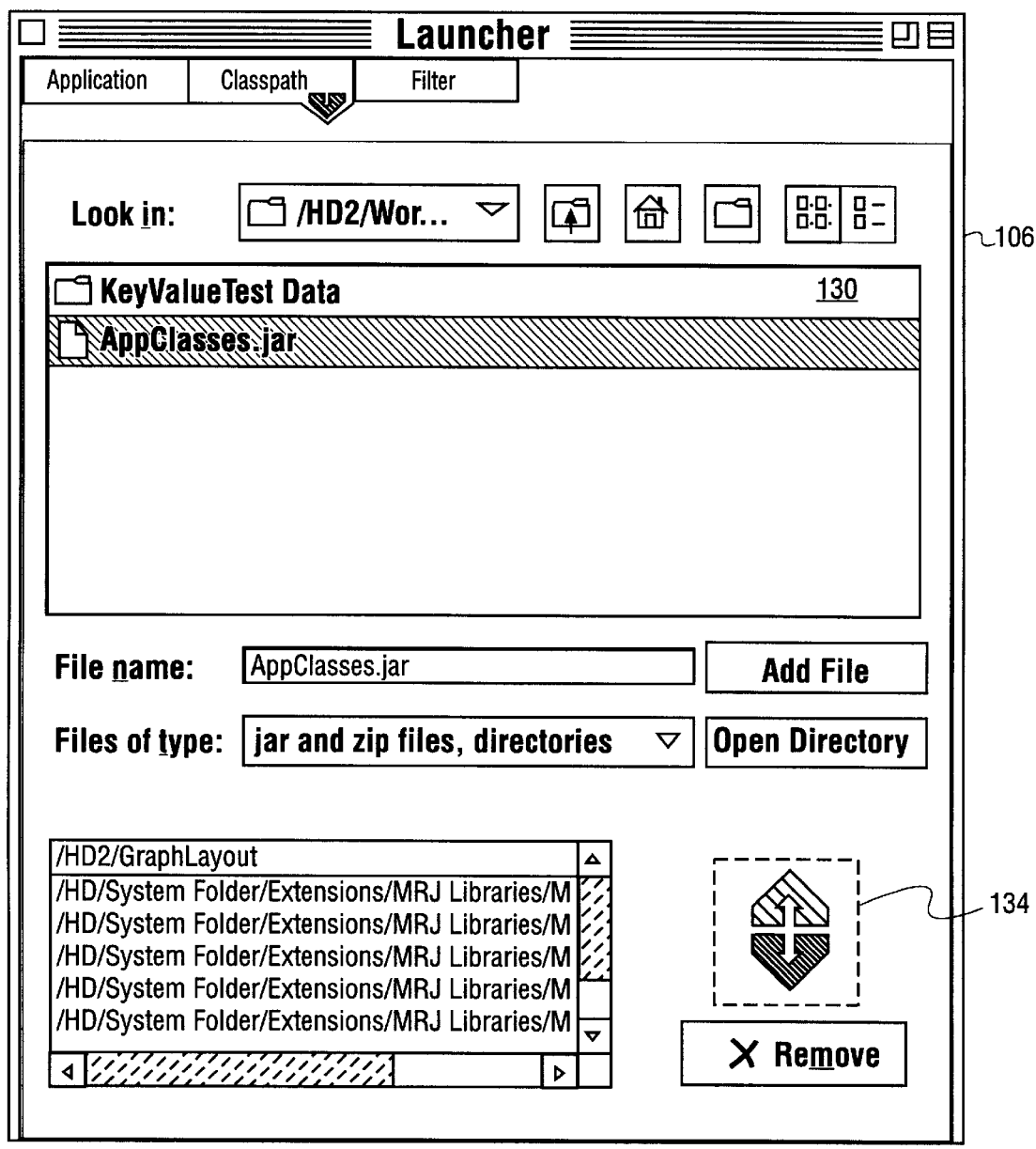

FIG. 11C provides an exemplary representation of the class path panel 106 by which a user may specify all class fields that the visualization tool 20 requires to successfully load an applet or application. Specifically, within the class path panel 106, a user may compose an ordered list of directories (containers), as well as .jar and .zip files, that contain appropriate class files 12.

An upper portion 130 of the class path panel 106 provides a directory tree for navigation purposes. Directories and files are listed in an active classpass list, which is maintained within the bottom portion 132 of the classpath panel 106. Directories and files in the active classpath list may be listed from top to bottom in the order in which they are to be loaded by the visualization tool 20. A user is presented with the option of rearranging the directories and files in the active classpath list utilizing the arrow buttons indicated at 134.

Figure 11D:
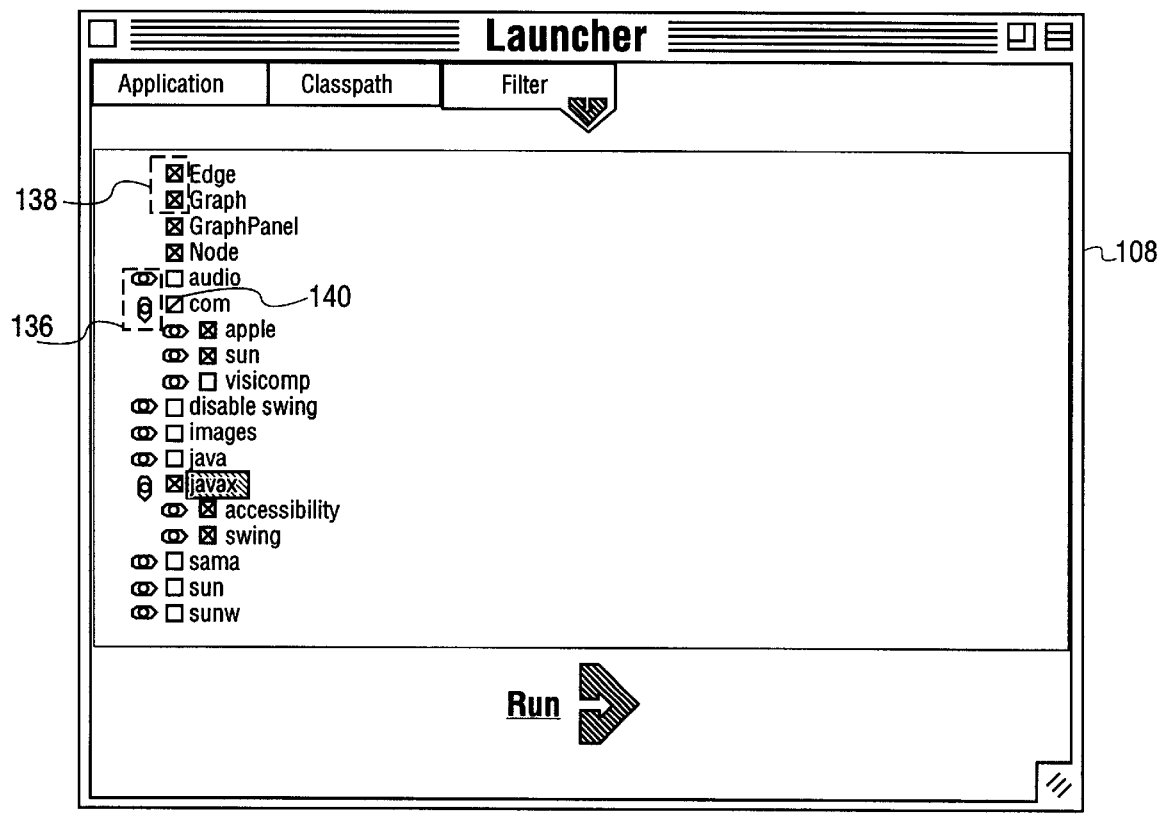

FIG. 11D provides an exemplary representation of the filter panel 108 by which a user may filter out classes, for example, that do not contribute towards a data structure that the user wishes to observe.

Specifically, the filter panel 108 may display a package/directory tree through which a user may enable/disable individual classes or entire packages for presentation by the display engine 26. As indicated, in one embodiment, packages are identified by "turner" icons 136 and display enabler check boxes 138. A package directory is open and displayed when an associated turner icon 136 is pointed downward. Each package may contain any number of classes, and subpackages are displayed in an indented hierarchical form. Classes are identified by display enabler check boxes 138 to the left of the names, without turner icons 136.

An entire package, or a single class within a package, may be enabled or disabled by an appropriate selection within an appropriate display enabler check box 138. As illustrated, the check boxes 138 provide three functional states for a particular package, namely an "all disabled" state, indicated by an empty check box 138, an "all enabled" state indicated by a crossed check box, and a "partially enabled" state indicated by a single traversing line through the check box 138, as illustrated at 140. At a package level, a "all disabled" indication indicates all classes within the specified package are disabled. An "all enabled" indication indicates that all classes within the specified package are enabled for viewing by the display engine 24. A "partially enabled" indication indicates that only a specified number of classes within the respective package are enabled.

At a class level, an "all enabled" indication indicates that the specified class is enabled for viewing utilizing display engine 26, while an "all disabled" indication indicates that the specified class is disabled for viewing.

Figure 12A:
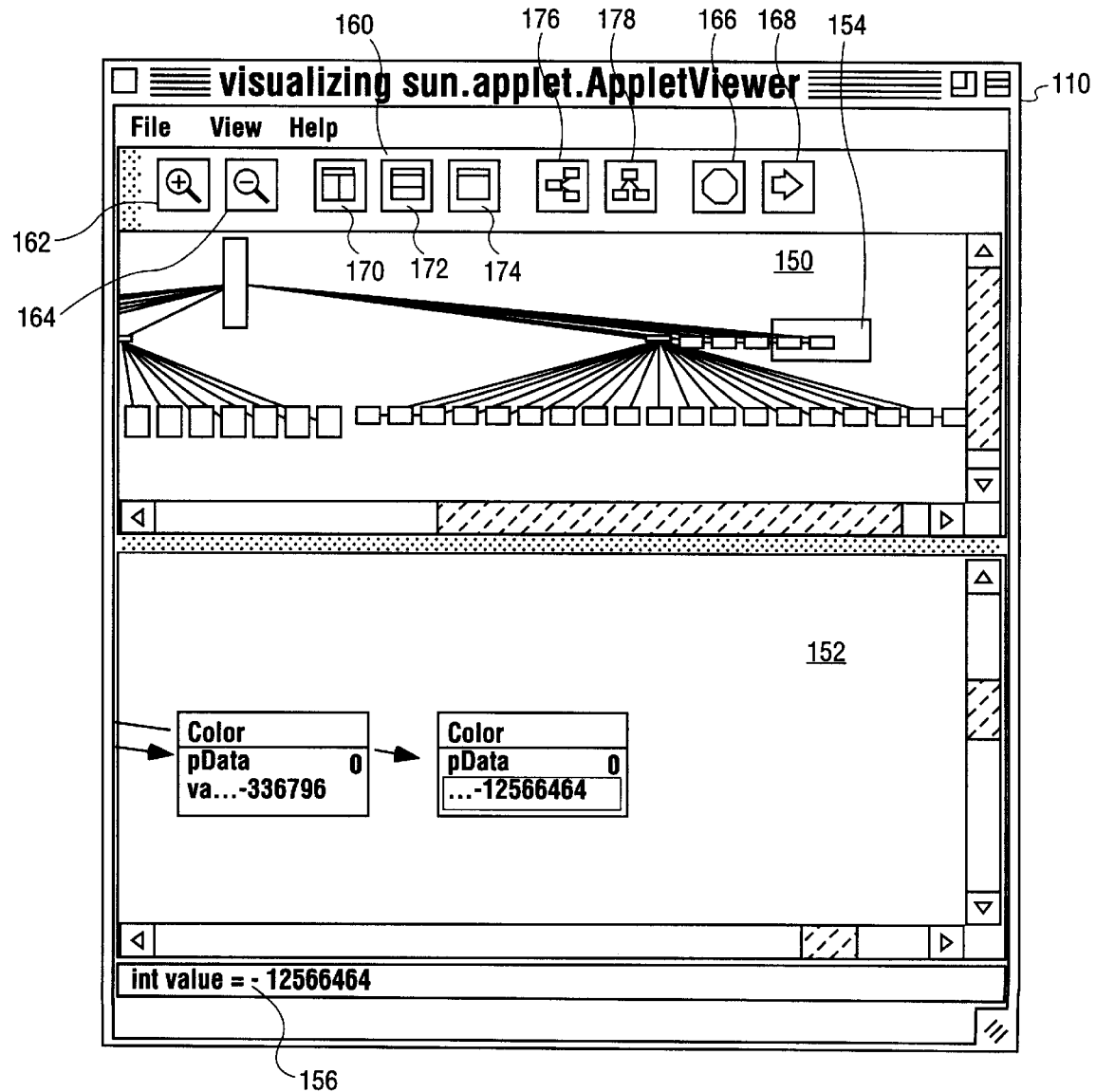
FIGS. 12A–12F illustrate further exemplary interfaces that may be presented within the context of a display window generated by the display engine.

FIG. 12A provides an exemplary representation of a display window 110. The display window 110 is shown, in one embodiment, to be divided into two distinct areas, in the form of panes. Specifically, an overview pane 150 presents an overview of at least a portion of the duplicate copy 27 of the data structure maintained by the shadow machine 24. A detail pane 152 provides a close view (or zoomed-in view) of a portion of the data structure shown in the overview pane 150. Specifically, the detail pane 152 displays at least a portion of the contents of each object, and includes arrows corresponding to reference variables.

The overview pane 150 includes a gray rectangle, conveniently termed a "panner" 154. In one embodiment, the size and shape of the panner 154 corresponds exactly to the visible region displayed in the detail pane 152. By dragging the panner 154 in the overview pane 150, a user may scroll the visible display in the detail pane 152.

In the overview and detail panes 150 and 152, nodes may represent instances and arrows (links) may represent object references. Text fields within the nodes reflect the names and current values of, for example, object data variables.

In addition to utilizing the panner 154 to dictate the contents of the detail pane 152, a user may select a node in the overview pane 150, and the detail pane 152 will scroll to reveal the details of the selected node.

Figure 12B:
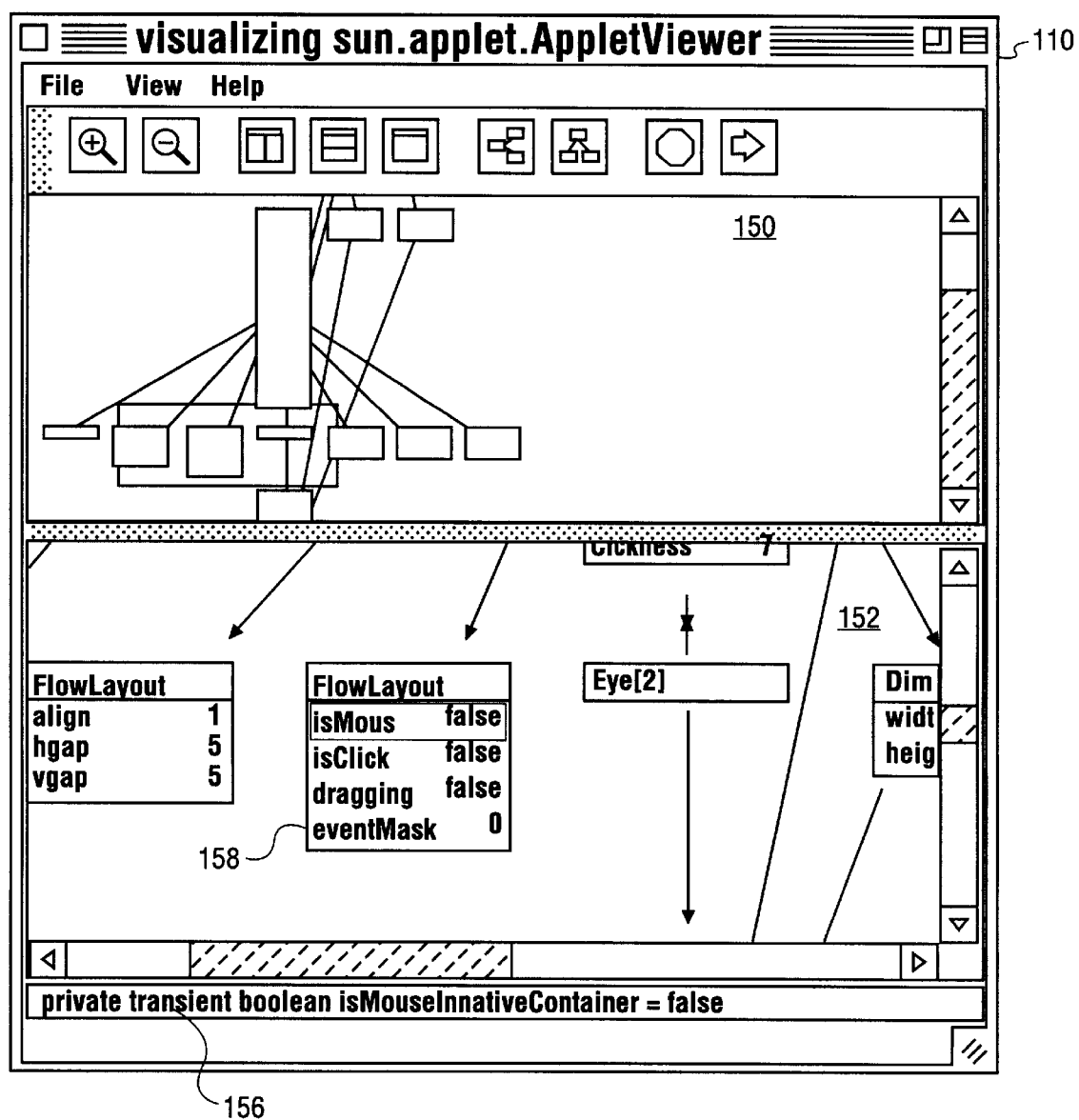

The display window 110 further includes a properties bar 156 in which the properties, name and current value for a selected data field of a relevant data structure represented by a node displayed within the detail pane 152. This feature is useful when the field name is too long to be fully displayed within a node, or if the variable type is unknown. FIG. 12B illustrates a selected variable name located within a selected node 158 that is fully displayed within the properties bar 156.

The display window 110 further includes a tool bar 160 that includes a collection of components. Specifically, zoom-in and zoom-out buttons 162 and 164 allow a user incrementally to magnify, or demagnify, the window image within the overview pane 150. A "pause" button 166 allows a user, during run-time of an augmented program code 30, to pause the construction and maintenance of the duplicate copy 27 of the original data structure. To resume real-time rendering of the display, a "resume" button 168 is presented for user selection.

Figure 12C:
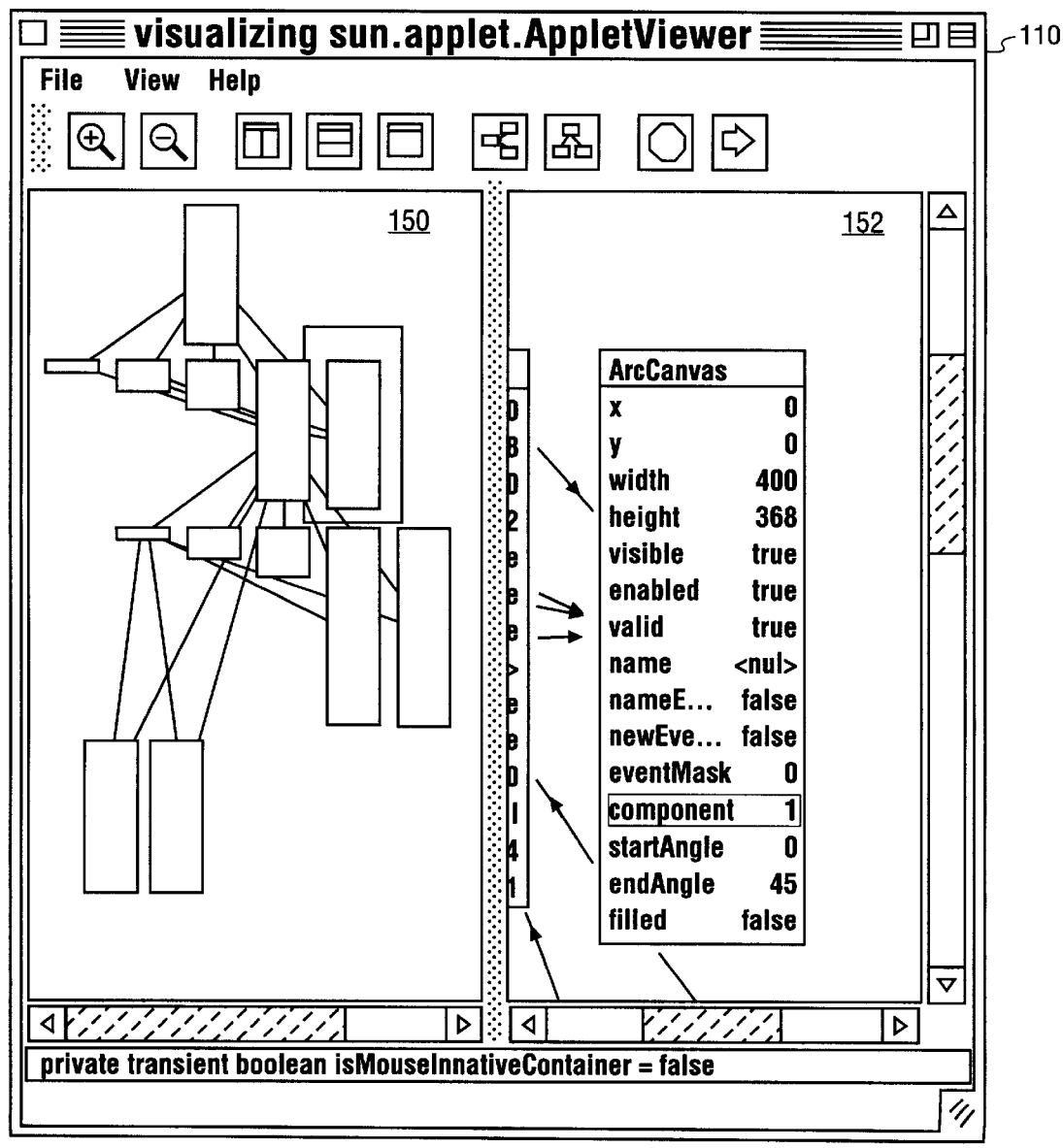
Figure 12D:
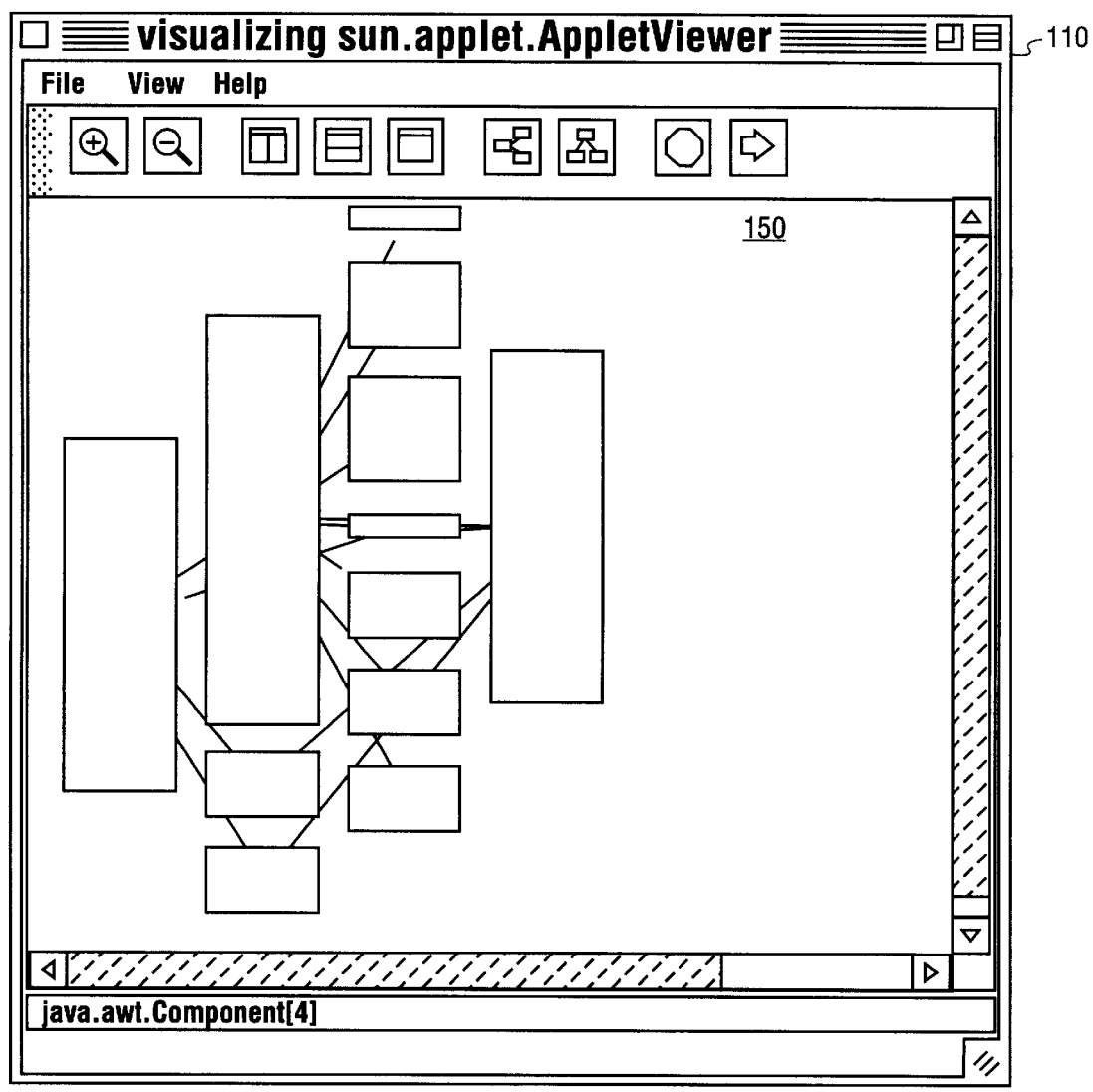

A collection of split-screen buttons 170, 172 and 174 are also presented within the tool bar 160. Specifically, a left/right split-screen button 170 allows the overview and detail panes 150 and 152 to be divided vertically, as shown in FIG. 12C. A top/bottom split-screen button 172 provides a horizontal division between the overview and detail panes 150 and 152. Finally, a single pane button 174 allows a user to achieve a larger view of an entire structure that may be too large to fit into a split-screen display. An example of such a single pane display is provided in FIG. 12D. In the single pane display, the display functions in the same manner as the overview window 150.

Figure 12E:
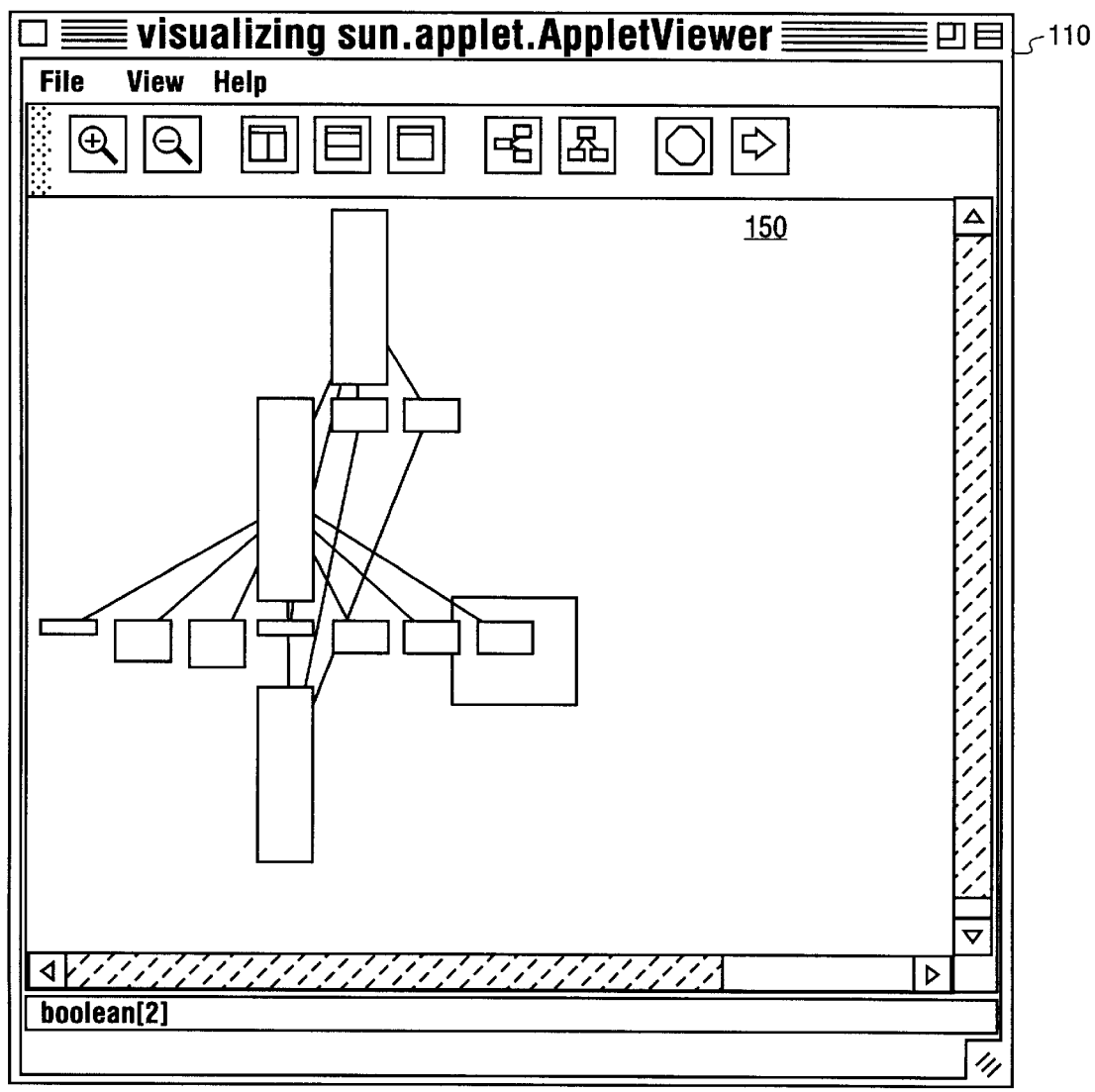
Figure 12F:
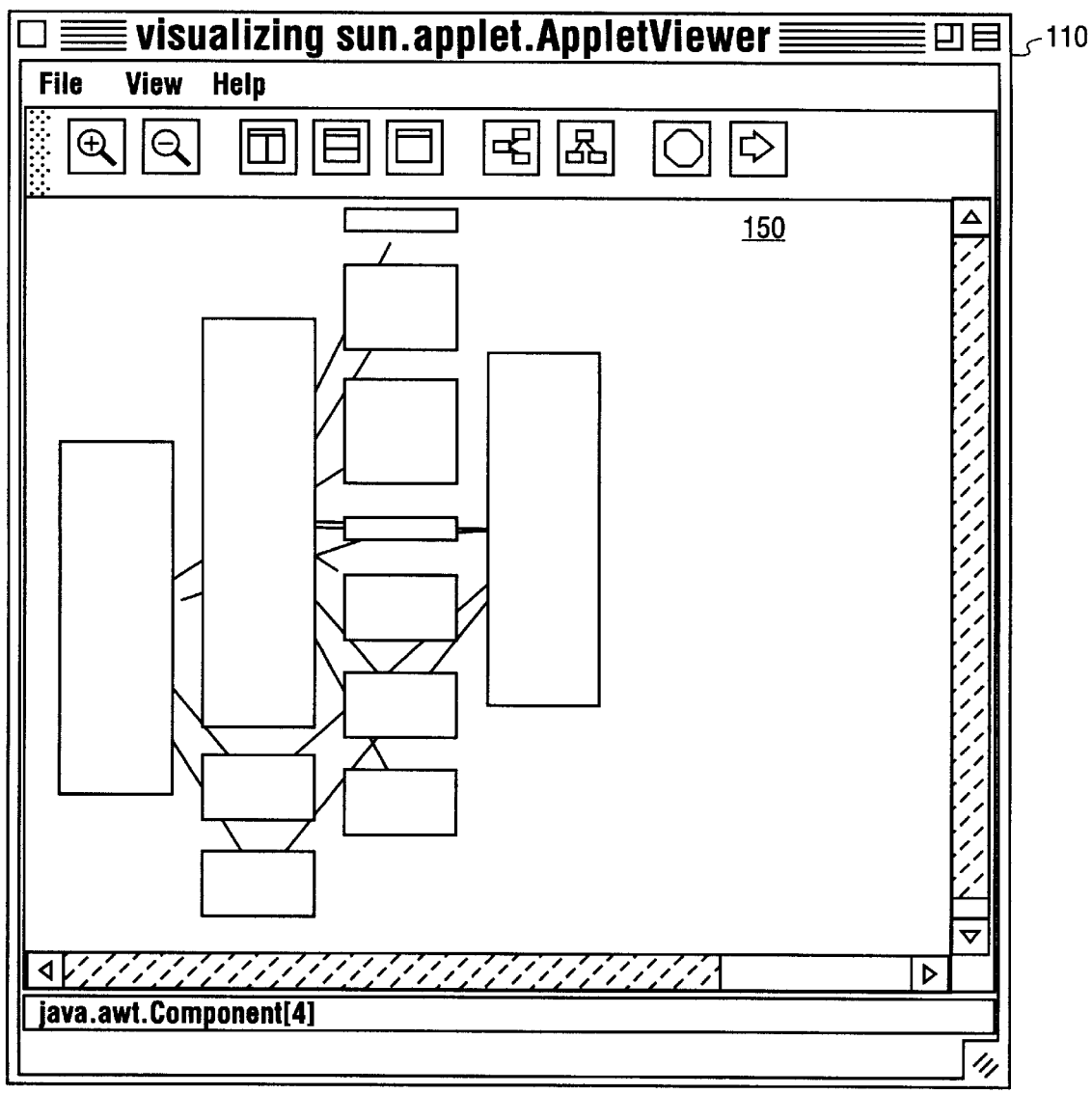

Finally, the toolbar 160 includes respective "horizontal-build" and "vertical-build" buttons 176 and 178. User selection of the horizontal-build button 176 causes a link-node representation of the duplicate copy 27 of the data structure to be horizontally rendered, while user selection of the vertical-build button 178 causes a link-node representation to be vertically rendered. It is useful, for example, to render a tree structure vertically, whereas a hash table may be better viewed utilizing a horizontal orientation. FIG. 12E provides an example of a vertical button node presentation whereas FIG. 12F provides an example of a horizontal built representation.

Computer System

Figure 13:
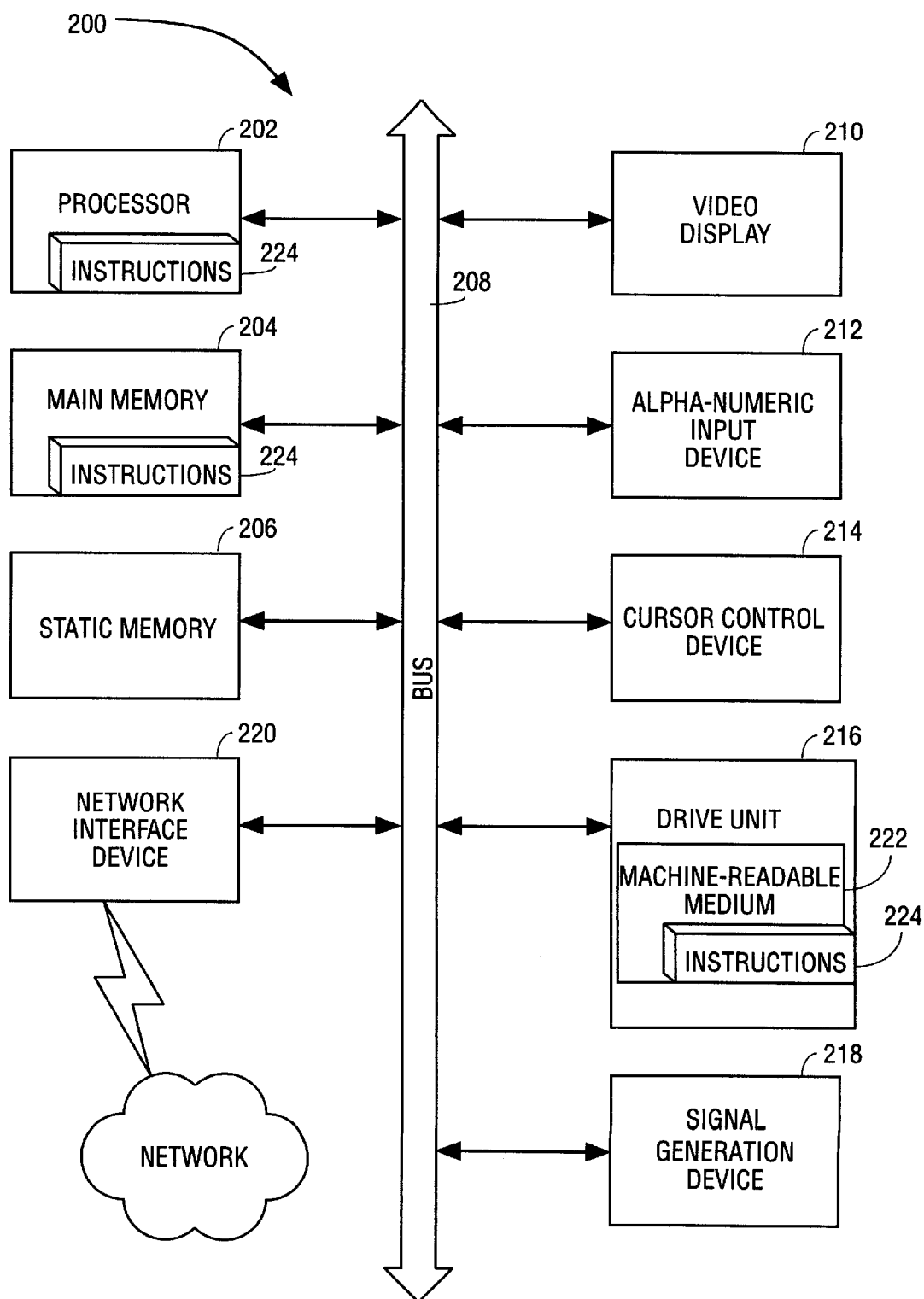
FIG. 13 is a diagrammatic representation of a machine, in the exemplary form of a computer system, within which a set of instructions for causing a machine to perform any of the exemplary methodologies of the present invention may be executed.

FIG. 13 shows a diagrammatic representation of machine in the exemplary form of a computer system 200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 320 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alpha-numeric input device 212 (e.g. a keyboard), a cursor control device 214 (e.g. a mouse), a disk drive unit 216, a signal generation device 218 (e.g. a speaker) and a network interface device 220.

The disk drive unit 216 includes a machine-readable medium 222 on which is stored a set of instructions (i.e., software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system for visualizing the functioning of a computer program have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of visualizing execution of a computer program, the method including:

maintaining a duplicate copy of a data structure of a computer program during execution of the computer program; and displaying a visual representation of the duplicate copy of the data structure on a display device so as to provide a visualization of the execution of the computer program.

2. The method of claim 1 including maintaining a duplicate copy of a value set of the computer program during execution of the computer program and displaying a visual representation of the duplicate copy of the value set on the display device.

3. The method of claim 2 wherein the maintaining includes issuing a call from the computer program, during execution thereof, to the duplicate copy of the value set.

4. The method of claim 3 wherein the call communicates a variable identifier and an update value, wherein the update value is attributed to a duplicate variable of the duplicate copy of the data structure.

5. The method of claim 2 including augmenting the computer program with call instructions to facilitate the maintenance of the duplicate copies of the data structure and the value set of the computer program.

6. The method of claim 5 including identifying a first instruction within the computer program that modifies a first variable value and augmenting the computer program with a first call instruction that communicates a variable identifier for the first variable and an update value for the first variable.

7. The method of claim 6 including identifying a duplicate first variable corresponding to the first variable and updating a value for the duplicate first variable utilizing the update value.

8. The method of claim 6 including identifying a second instruction within the computer program that causes entry of a method by the computer program and augmenting the computer program with a second call instruction that adds a duplicate method frame to a list within the duplicate copy of the data structure.

9. The method of claim 8 including identifying a third instruction within the computer program that causes exit from a method by the computer program and augmenting the computer program with a third call instruction that removes a duplicate method frame from a list within the duplicate copy of the data structure.

10. The method of claim 2 wherein the display of the visual representation includes displaying a visual representation of the duplicate copy of the value set.

11. The method of claim 10 wherein the value set includes variable values and the visual representation provides a run-time display of variable value updating as reflected in the duplicate copy of the value set.

12. The method of claim 2 wherein the visual representation is dynamically varied to reflect modifications to the duplicate copy of the value set during run-time of the computer program.

13. The method of claim 1 wherein the display of the visual representation includes displaying a node-link representation of the duplicate copy of the data structure.

14. The method of claim 13 wherein a first node of the link-node representation represents a class of the data structure as reflected in the duplicate copy thereof.

15. The method of claim 13 wherein a node of the link-node representation represents an object of the data structure, the object comprising an instantiation of a class of the data structure as reflected in the duplicate copy thereof.

16. The method of claim 13 wherein a first link of the link-node representation represents an object reference.

17. The method of claim 13 including, responsive to a user selection, displaying the link-node representation in a horizontal orientation.

18. The method of claim 13 including, responsive to a user selection, displaying the link node representation in a vertical orientation.

19. The method of claim 1 wherein the maintaining of the duplicate copy of the data structure includes issuing a call from the computer program, during the execution thereof, to the duplicate copy of the data structure.

20. The method of claim 19 wherein the call communicates entry to a method by the computer program, responsive to which a duplicate method frame is added to a list for a current thread of the computer program.

21. The method of claim 19 wherein the call communicates exit of a method by the computer program, responsive to which a duplicate method frame is removed from a list for a current thread of the computer program.

22. The method of claim 21 wherein the duplicate method frame is removed from the top of the list.

23. The method of claim 1 wherein the duplicate copy of the data structure includes at least one of a group including duplicate thread, frame, class, object and array structures.

24. The method of claim 1 wherein the computer program comprises Java instructions executable by a Java Virtual Machine.

25. The method of claim 1 wherein a programming environment of the computer program places restrictions on access to the data structure and a value set of the computer program during execution thereof.

26. The method of claim 1 wherein the display of the visual representation includes displaying a graphical representation of the duplicate copy of the data structure.

27. The method of claim 26 wherein the graphical representation is dynamically varied to reflect modifications to the duplicate copy of the data structure during a run-time of the computer program.

28. The method of claim 27 wherein the data structure of the computer includes classes and objects instantiated from the classes, and the graphical representation provides a run-time display of class instantiations as reflected in the duplicate copy of the data structure.

29. The method of claim 27 wherein the graphical representation provides a run-time display of reference variable modifications as reflected in the duplicate copy of the data structure.

30. The method of claim 1 wherein the display of the visual representation includes displaying a zoomed-out view of the data structure, as represented by the duplicate copy, in a first graphically distinct area and displaying a zoom-in view of the data structure, as represented by the duplicate copy, in a second graphically distinct area.

31. The method of claim 30 wherein a data structure representation presented only in the zoomed-in view presents variable and value information.

32. The method of claim 30 including defining a pan view region within the first graphically distinct area that is user locatable with reference to the zoomed-out view of the data structure, a portion of the duplicate of the data structure displayed within the pan view region being displayed within the second graphically distinct area.

33. The method of claim 30 wherein both the first and second graphically distinct areas can be zoomed into and out of responsive to a user selection.

34. A system to visualize operation of a computer program, the system including:
   a shadow structure to maintain a duplicate copy of a data structure of a computer program during execution of the computer program; and
   a display engine to display a visual representation of the duplicate copy of the data structure on a display device so as to provide a visualization of the operation of the computer program.

35. The system of claim 34 wherein the shadow structure is to maintain a duplicate copy of a value set of the computer program during execution of the computer program and the display engine is to display a visual representation of the duplicate copy of the value set on the display device.

36. The system of claim 35 wherein the shadow structure receives a call from the computer program, during execution thereof, to modify the duplicate copy of the value set.

37. The system of claim 36 wherein the call communicates a variable identifier and an update value, wherein the update value is attributed to a duplicate variable of the duplicate copy of the data structure by the shadow structure.

38. The system of claim 35 including an augmenter to augment the computer program with call instructions to facilitate the maintenance of the duplicate copies of the data structure and the value set of the computer program.

39. The system of claim 38 wherein the augmenter identifies a first instruction within the computer program that modifies a value of a first variable and augments the computer program with a first call instruction that communicates a variable identifier for the first variable and an update value for the first variable.

40. The system of claim 39 wherein the augmenter identifies a duplicate first variable corresponding to the first variable and updates a value for the duplicate first variable utilizing the update value.

41. The system of claim 39 wherein the augmenter identifies a second instruction within the computer program that causes entry of a method by the computer program and augments the computer program with a second call instruction that adds a duplicate method frame to a list within the duplicate coy of the data structure.

42. The system of claim 41 wherein the augmenter identifies a third instruction within the computer program that causes exit from a method by the computer program and augments the computer program with a third call instruction that removes a duplicate method frame from a list within the duplicate copy of the data structure.

43. The system of claim 35 wherein the display engine dynamically varies the visual representation to reflect modifications to the duplicate copy of the value set during run-time of the computer program.

44. The system of claim 1 wherein the value set includes variable values and the display engine displays the visual representation to provide a run-time display of variable value updating as reflected in the duplicate copy of the value set.

45. The system of claim 34 wherein the shadow structure receives a call from the computer program, during the execution thereof, to modify the duplicate copy of the data structure.

46. The system of claim 45 wherein the call received by the shadow structure is issued as a result of execution of a call instruction included within the computer program.

47. The system of claim 45 wherein the call received by the shadow structure is issued as a result of a detection of a predetermined instruction type in the computer program by an interpreter.

48. The system of claim 45 wherein the call received by the shadow structure is issued as a result of execution of a call instruction included within the computer program.

49. The system of claim 45 wherein the call communicates entry to a method by the computer program, responsive to which a duplicate method frame is added to a list for a current thread of the computer program by the shadow structure.

50. The system of claim 45 wherein the call communicates exit of a method by the computer program, responsive to which a duplicate method frame is removed from a list for a current thread of the computer program by the shadow structure.

51. The system of claim 50 wherein the duplicate method frame is removed from the top of the list.

52. The system of claim 34 wherein the duplicate copy of the data structure includes at least one of a group including duplicate thread, frame, class, object and array structures.

53. The system of claim 34 wherein the computer program comprises Java instructions executable by a Java Virtual Machine.

54. The system of claim 34 wherein a programming environment of the computer program places restrictions on access to the data structure and a value set of the computer program during execution thereof.

55. The system of claim 34 wherein the display engine displays a graphical representation of the duplicate copy of the data structure.

56. The system of claim 55 wherein the display engine dynamically varies the graphical representation to reflect modifications to the duplicate copy of the data structure during a run-time of the computer program.

57. The system of claim 56 wherein the data structure of the computer includes classes and objects instantiated from the classes, and the display engine displays the graphical representation to provide a run-time display of class instantiations as reflected in the duplicate copy of the data structure.

58. The system of claim 56 wherein the display engine displays the graphical representation to provide a run-time display of reference variable modifications as reflected in the duplicate copy of the data structure.

59. The system of claim 34 wherein the display engine displays a node-link representation of the duplicate copy of the data structure.

60. The system of claim 59 wherein a node of the link-node representation represents a class of the data structure as reflected in the duplicate copy thereof.

61. The system of claim 59 wherein a node of the link-node representation represents an object of the data structure, the object comprising an instantiation of a class of the data structure as reflected in the duplicate copy thereof.

62. The system of claim 59 wherein a first link of the link-node representation represents an object reference.

63. The system of claim 59 including, responsive to a user selection, displaying the link-node representation in a horizontal orientation.

64. The system of claim 59 including, responsive to a user selection, displaying the link-node representation in a vertical orientation.

65. The system of claim 34 wherein the display engine displays a zoomed-out view of the data structure, as represented by the duplicate copy, in a first graphically distinct area and displays a zoom-in view of the data structure, as represented by the duplicate copy, in a second graphically distinct area.

66. The system of claim 65 wherein a data structure representation presented only in the zoomed-in view presents variable and value information.

67. The system of claim 65 wherein the display engine defines a pan view region within the first graphically distinct area that is user locatable with reference to the zoomed-out view of the data structure, a portion of the duplicate of the data structure displayed within the pan view region being displayed by the display engine within the second graphically distinct area.

68. The system of claim 65 wherein both the first and second graphically distinct areas can be zoomed into and out of responsive to a user selection utilizing the display engine.

69. A system to visualize operation of the computer program, the system including:
   a first means for maintaining a duplicate copy of a data structure of a computer program during execution of the computer program; and
   second means for generating a display of a visual representation of the duplicate copy of the data structure on a display device so as to provide a visualization of the operation of the computer program.

70. A machine-readable medium having a sequence of instructions stored thereon that, when executed by a machine, cause the machine to:
   maintain a duplicate copy of a data structure of a computer program during execution of the computer program; and
   display a visual representation of the duplicate copy of the data structure on a display device so as to provide a visualization of the execution of the computer program.

* * * * *

UNITED STATES PATENT AND TRADEMARK OFFICE
CERTIFICATE OF CORRECTION

PATENT NO.    : 6,429,860 B1                                            Page 1 of 1
DATED         : August 6, 2002
INVENTOR(S)   : Hughes It is certified that error appears in the above-identified patent and that said Letters Patent is hereby corrected as shown below:

Column 1,
Line 41, delete "JVMs)" and insert -- (JVMs) --.

Column 7,
Line 6, delete "block 941" and insert -- block 94, --.

Column 8,
Line 60, delete "(e.g., jar, zip, etc.)" and insert -- (e.g., .jar, .zip, etc.) --.

Column 14,
Line 47, delete "system of claim 1" and insert -- system of claim 35 --.

Signed and Sealed this

Twenty-sixth Day of August, 2003

JAMES E. ROGAN
*Director of the United States Patent and Trademark Office*